United States Patent
Shanklin et al.

[11] Patent Number: 5,860,574
[45] Date of Patent: Jan. 19, 1999

[54] PUMP ASSEMBLY WITH BAYONET LOCK

[75] Inventors: Donald J. Shanklin, Fullerton; Ronald F. Englhard, Mission Viejo, both of Calif.

[73] Assignee: Hayes Products, LLC, Buena Park, Calif.

[21] Appl. No.: 949,571

[22] Filed: Oct. 14, 1997

Related U.S. Application Data

[63] Continuation of Ser. No. 812,790, Mar. 6, 1997.

[51] Int. Cl.$^6$ ........................................................ B67D 5/40
[52] U.S. Cl. ........................ 222/530; 222/383.3; 222/385; 222/538; 403/381
[58] Field of Search ...................................... 239/373, 333; 222/383.3, 385, 530, 538, 181.3; 403/331, 349, 381

[56] References Cited

U.S. PATENT DOCUMENTS

| | | |
|---|---|---|
| 1,417,951 | 5/1922 | Staples et al. . |
| 1,730,684 | 10/1929 | Phillips . |
| 1,814,504 | 7/1931 | Collins . |
| 2,048,142 | 7/1936 | Santurello . |
| 2,341,031 | 2/1944 | Flynn . |
| 2,342,288 | 2/1944 | Mai . |
| 2,521,164 | 9/1950 | Hayes . |
| 2,631,319 | 3/1953 | Gotsfeld . |
| 2,881,810 | 4/1959 | Breitenstein . |
| 3,082,985 | 3/1963 | Herdman . |
| 3,156,282 | 11/1964 | Bedford, Jr. . |
| 3,299,960 | 1/1967 | Stern . |
| 3,792,800 | 2/1974 | Capra et al. . |
| 3,797,748 | 3/1974 | Nozawa et al. . |
| 3,901,414 | 8/1975 | Capra et al. . |
| 3,901,449 | 8/1975 | Bochmann . |
| 3,921,861 | 11/1975 | Kondo . |
| 3,940,029 | 2/1976 | Horvath . |
| 4,105,145 | 8/1978 | Capra . |
| 4,109,832 | 8/1978 | Kutik et al. . |
| 4,155,489 | 5/1979 | Steiman . |
| 4,167,941 | 9/1979 | Capra et al. . |
| 4,174,055 | 11/1979 | Capra et al. . |
| 4,176,764 | 12/1979 | Capra et al. . |
| 4,183,449 | 1/1980 | Blake . |
| 4,192,464 | 3/1980 | Bochmann . |
| 4,210,261 | 7/1980 | Trujillo et al. . |
| 4,222,500 | 9/1980 | Capra et al. . |
| 4,222,501 | 9/1980 | Hammett et al. . |
| 4,231,493 | 11/1980 | Kutik et al. . |
| 4,235,353 | 11/1980 | Capra et al. . |
| 4,260,082 | 4/1981 | Rooney et al. . |
| 4,271,990 | 6/1981 | Kutik et al. . |
| 4,325,499 | 4/1982 | Shay . |
| 4,325,500 | 4/1982 | Shay . |
| 4,325,501 | 4/1982 | Shay . |
| 4,392,594 | 7/1983 | Swett et al. . |
| 4,524,888 | 6/1985 | Tada . |

(List continued on next page.)

FOREIGN PATENT DOCUMENTS

| | | |
|---|---|---|
| 0583902A1 | 2/1994 | European Pat. Off. . |
| 935738 | 8/1993 | South Africa . |
| 963912 | 7/1964 | United Kingdom . |
| 2269796 | 2/1994 | United Kingdom . |
| WO9403278 | 2/1994 | WIPO . |

*Primary Examiner*—Kevin P. Shaver
*Attorney, Agent, or Firm*—Knobbe, Martens, Olson & Bear, LLP

[57] ABSTRACT

An assembly including a pump attachment particularly adapted to form an nonaerosol pump sprayer, and a method of using the same. The apparatus desirably includes an attachment having a pump which is pressurized on the upstroke enabling the pump to be shipped and stored in a relaxed position. The container defines a wall and a first stud and a second stud. Each of the first stud and the second stud form a head portion and a stem portion. The assembly includes a sprayer which has a spray end and a wall. The wall defines a first opening and a second opening, each of the which form a first portion wider than the stem portion and narrower than the head portion; and a second portion wider than the head portion.

4 Claims, 18 Drawing Sheets

U.S. PATENT DOCUMENTS

| | | |
|---|---|---|
| 4,723,666 | 2/1988 | Nichols . |
| 4,787,602 | 11/1988 | Pidgeon . |
| 4,809,878 | 3/1989 | Rainey . |
| 4,872,595 | 10/1989 | Hammett et al. . |
| 4,899,913 | 2/1990 | Ruscitti et al. . |
| 4,901,878 | 2/1990 | Humphries . |
| 4,932,624 | 6/1990 | Holm ................................ 222/181.2 X |
| 5,183,189 | 2/1993 | Baudin . |
| 5,193,244 | 3/1993 | Meyers . |
| 5,381,932 | 1/1995 | Humphrey . |
| 5,395,032 | 3/1995 | Fuchs . |
| 5,419,463 | 5/1995 | Mizushima et al. . |
| 5,429,275 | 7/1995 | Katz . |
| 5,465,877 | 11/1995 | Bell et al. ............................ 222/181.2 |
| 5,469,993 | 11/1995 | Hauf et al. . |
| 5,497,944 | 3/1996 | Weston et al. . |

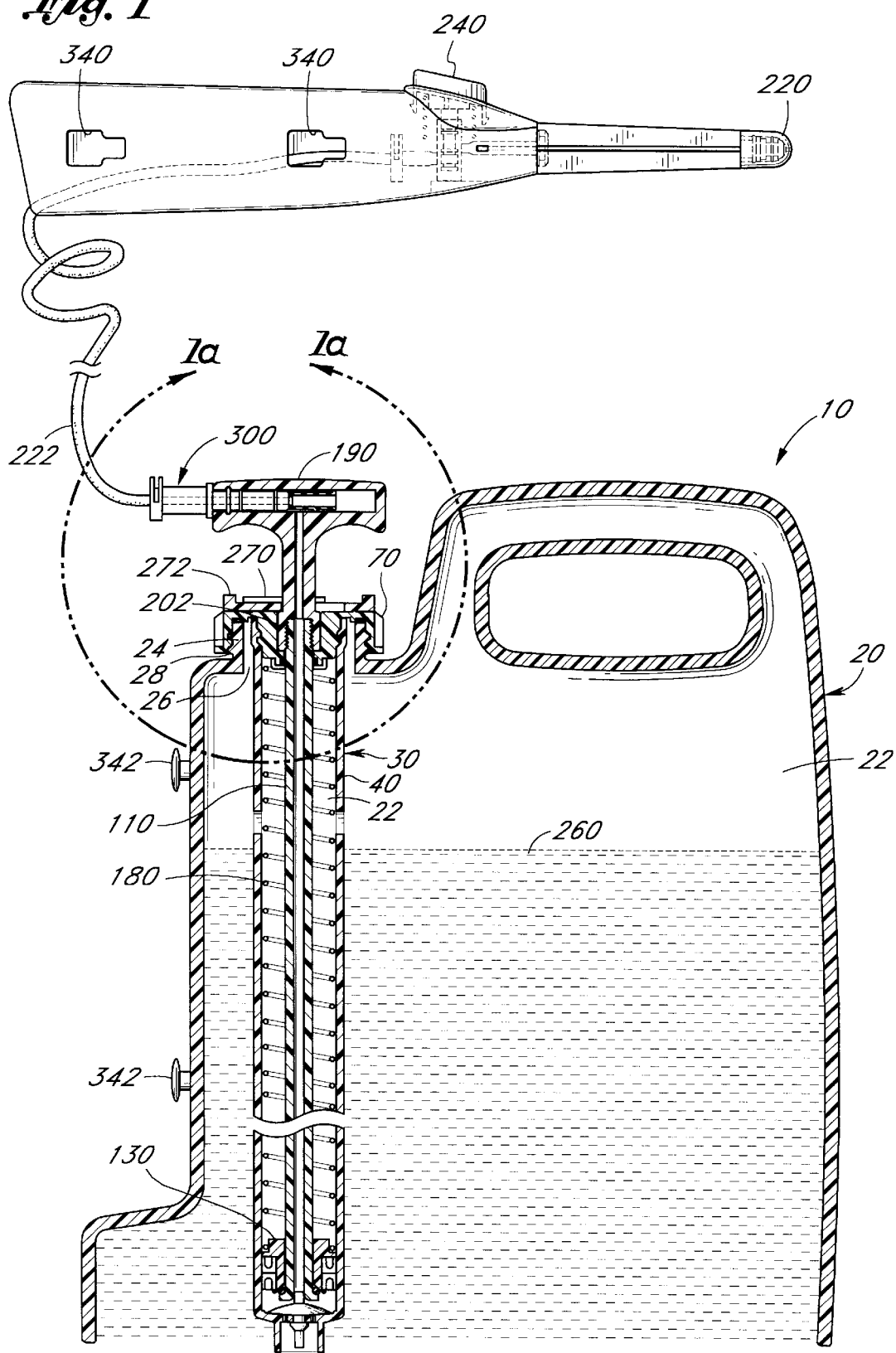

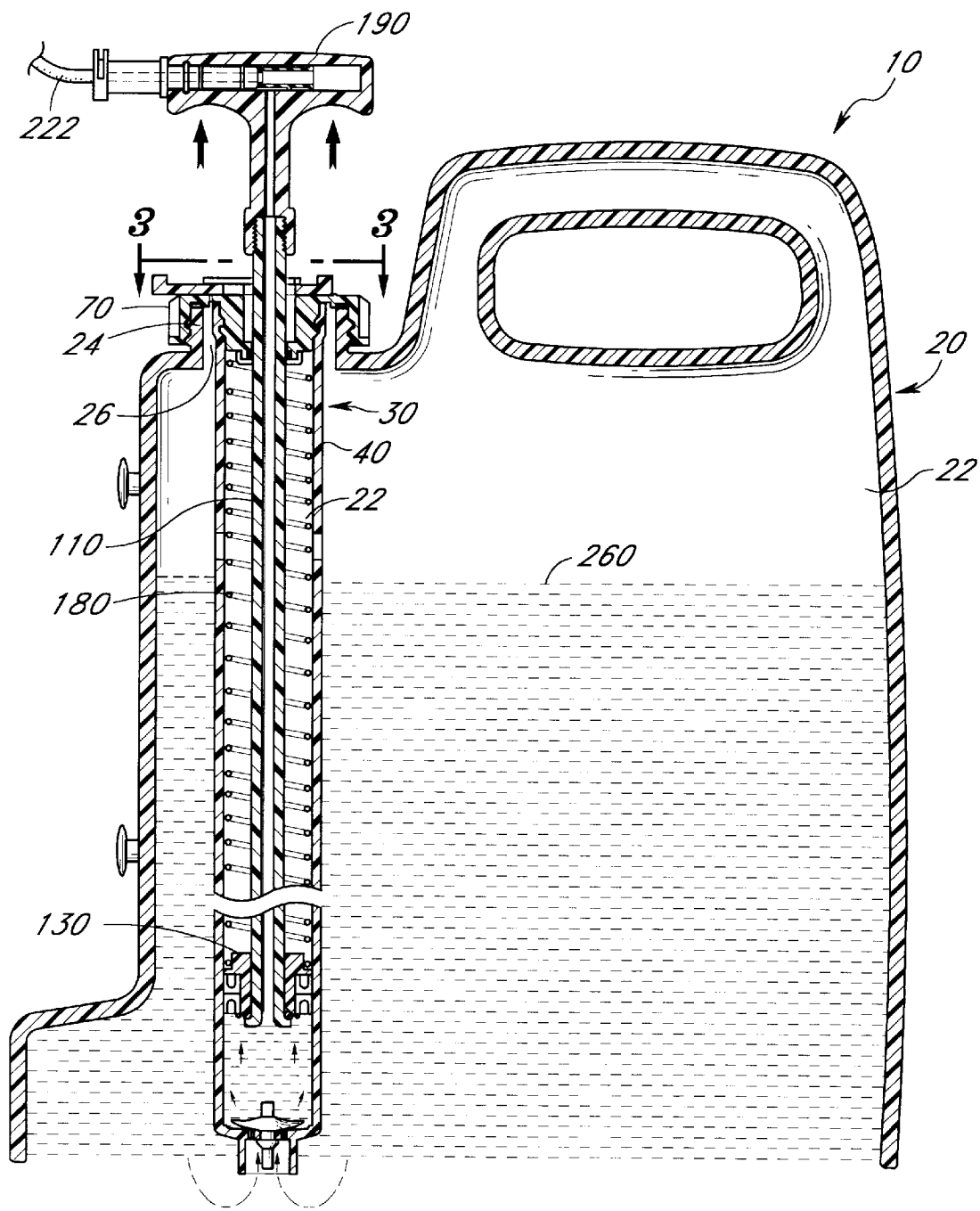

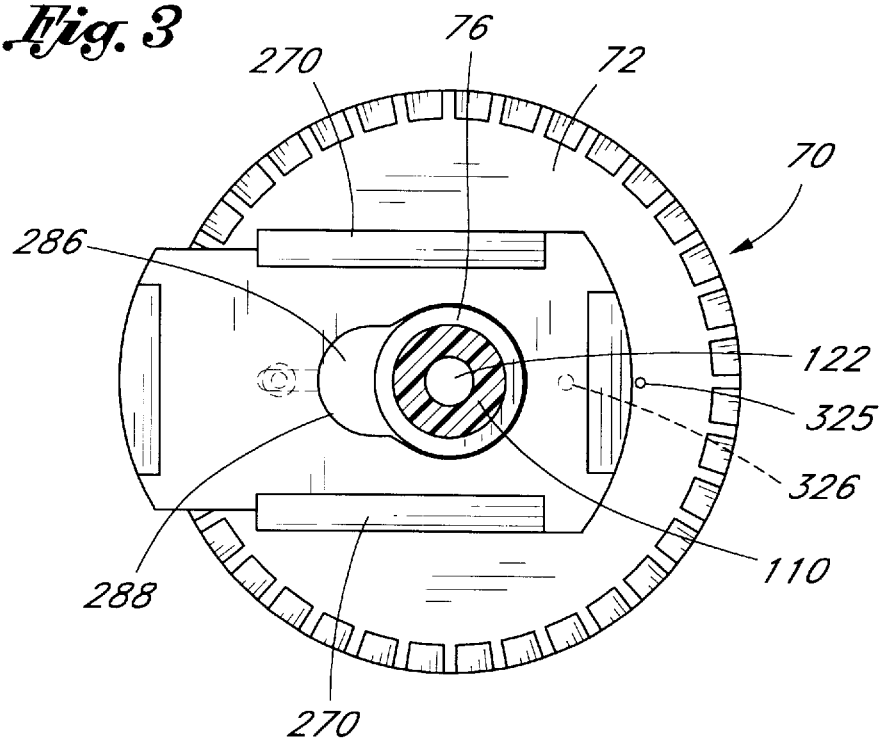
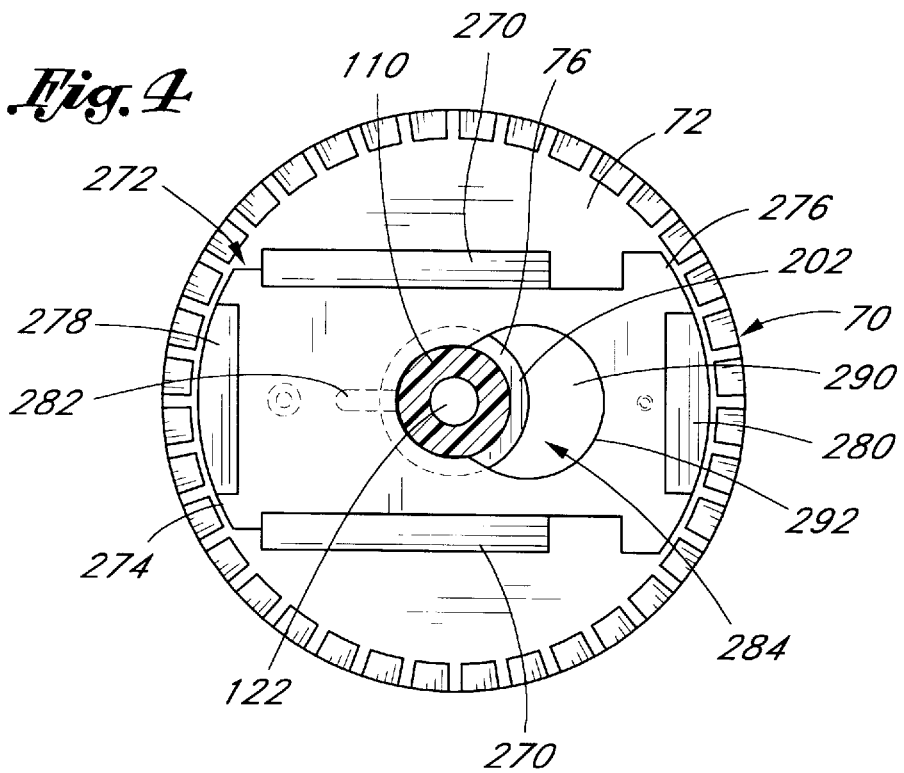

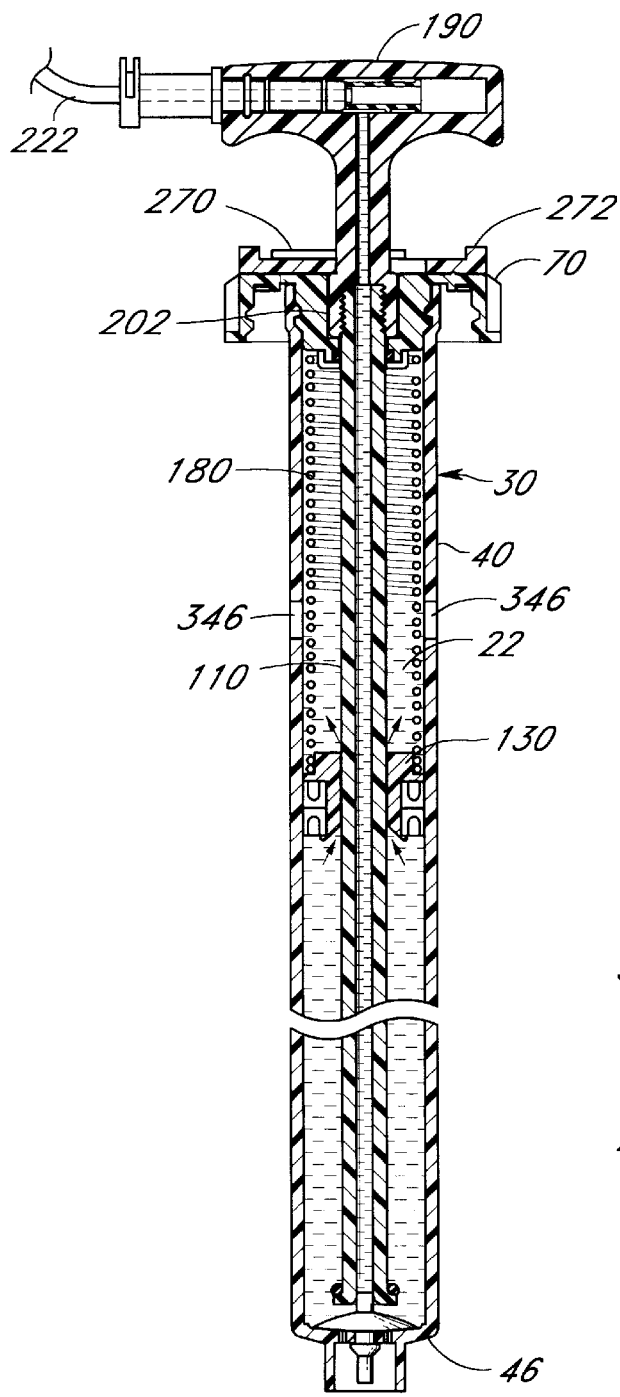
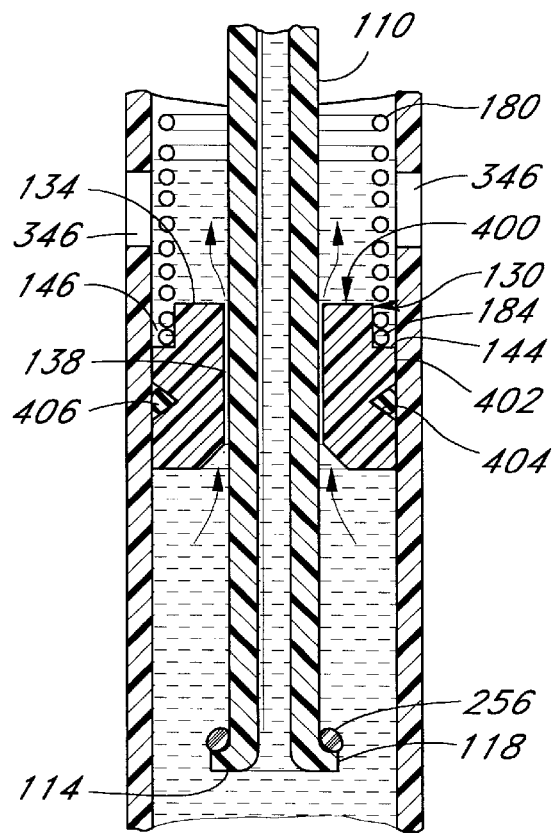

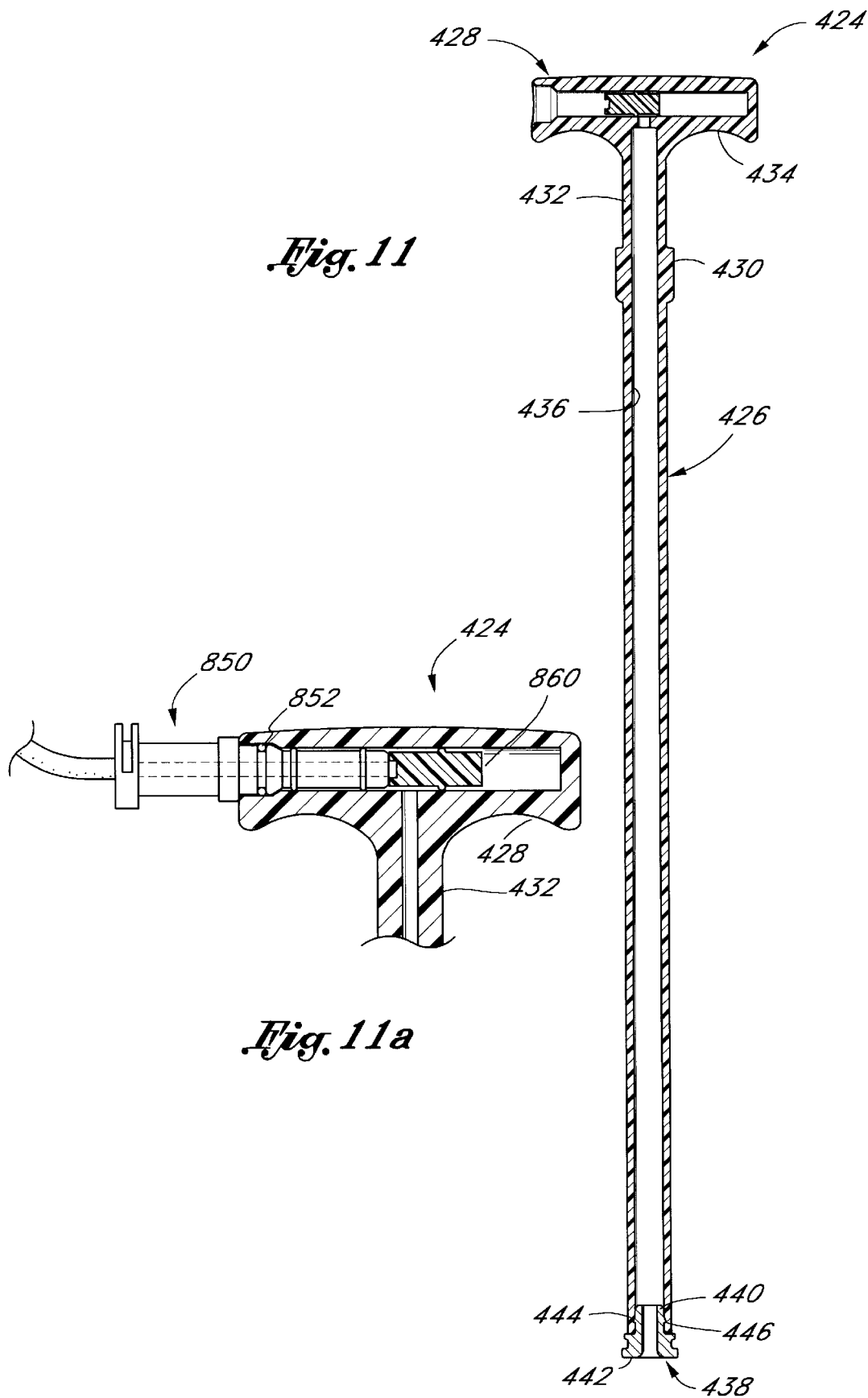

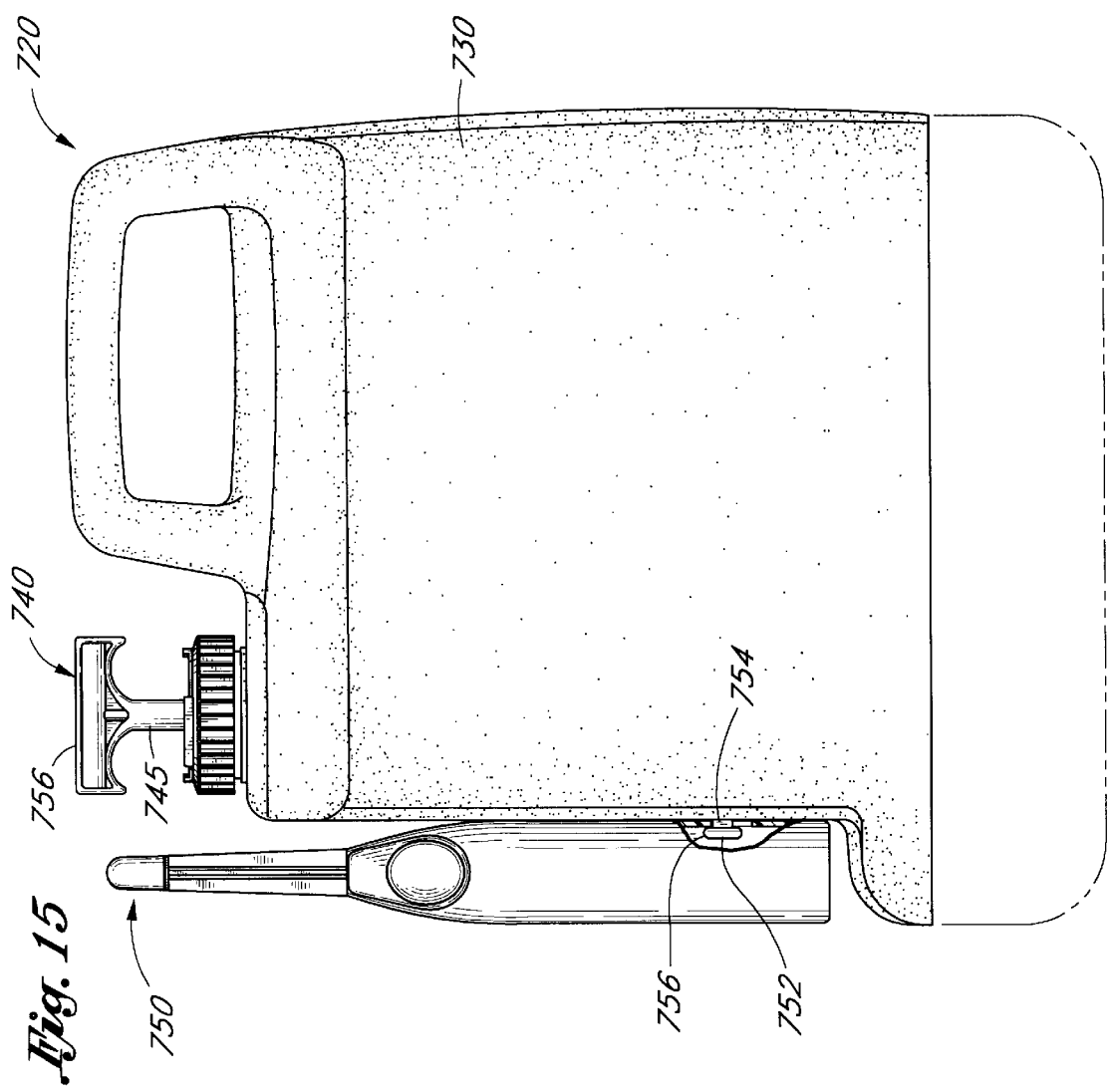
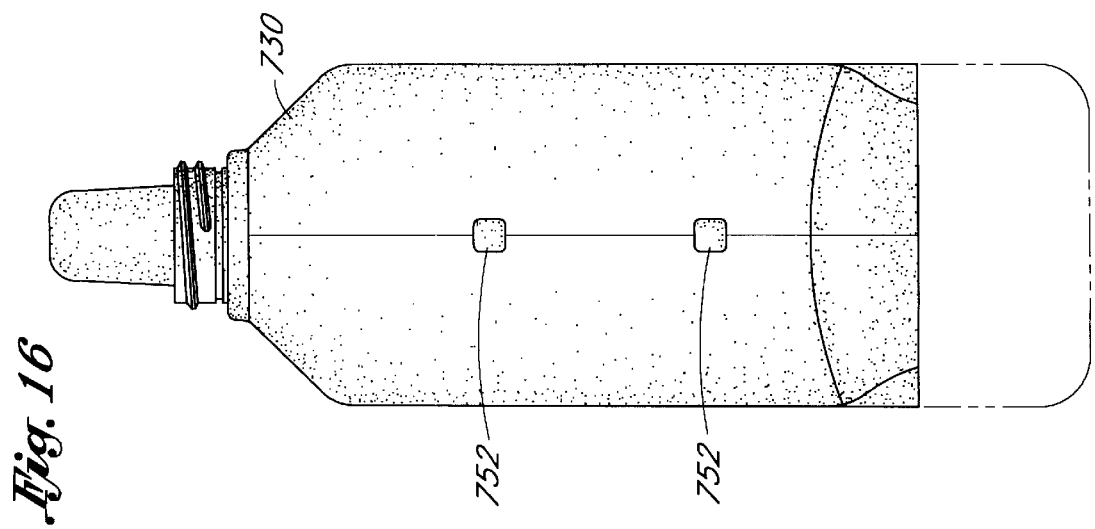

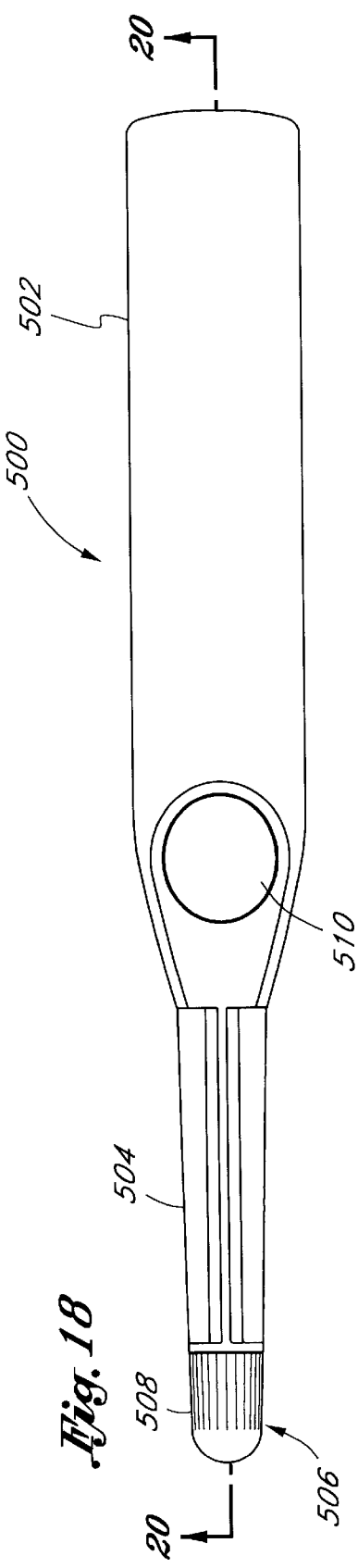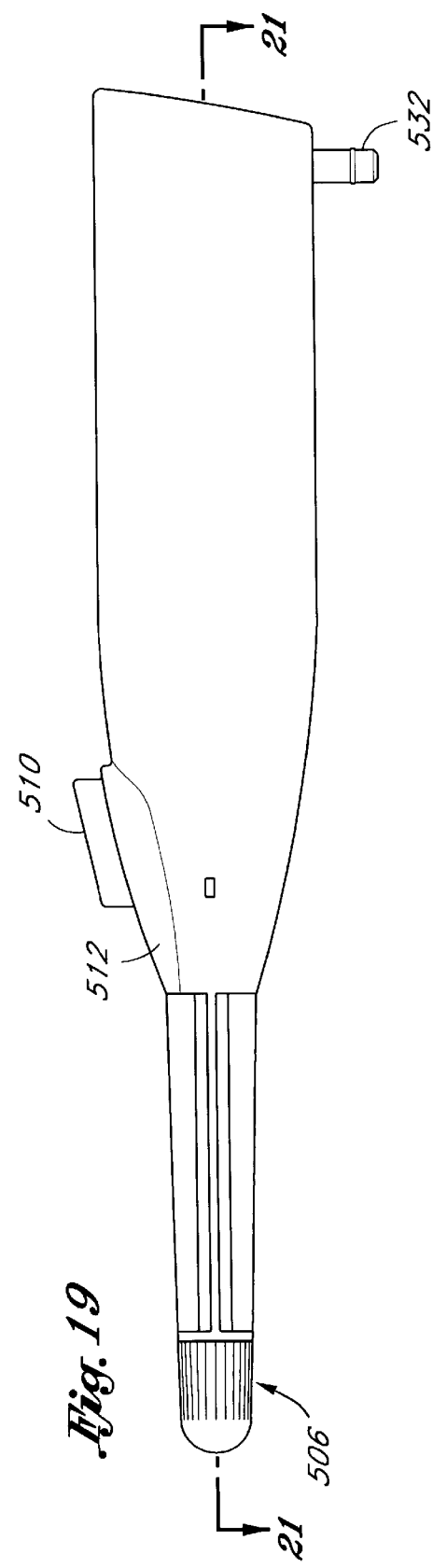

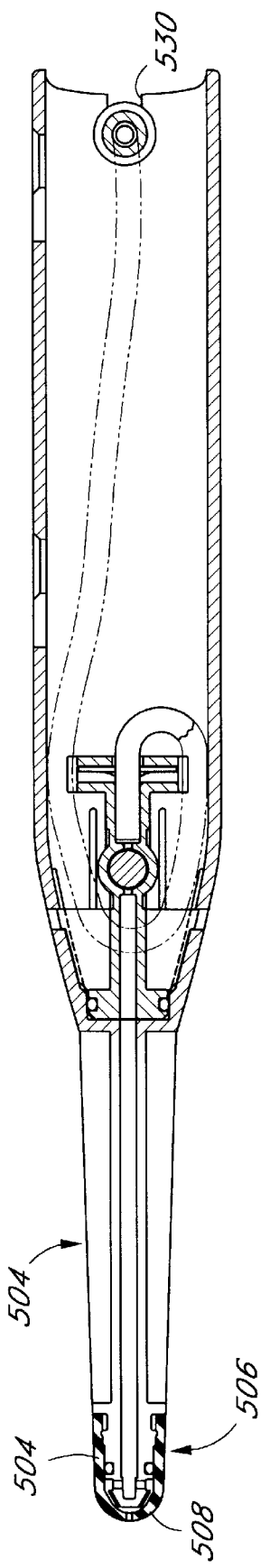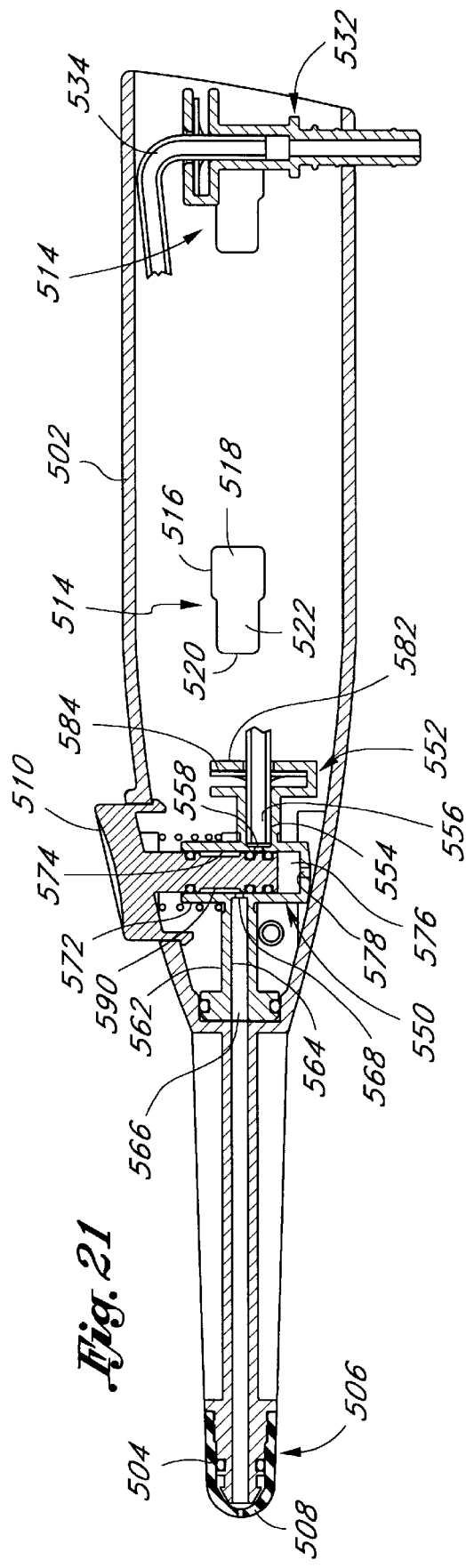

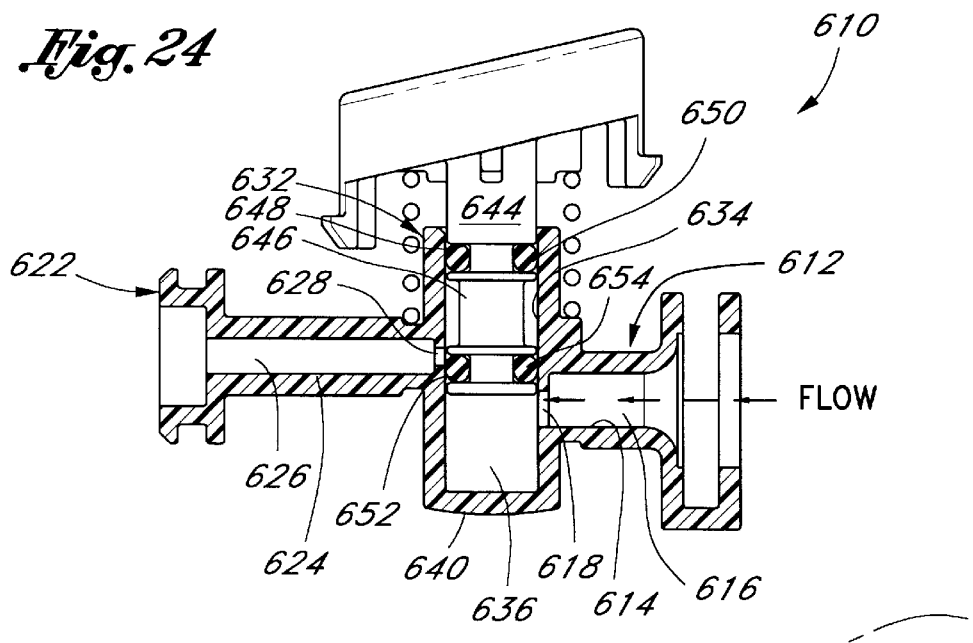
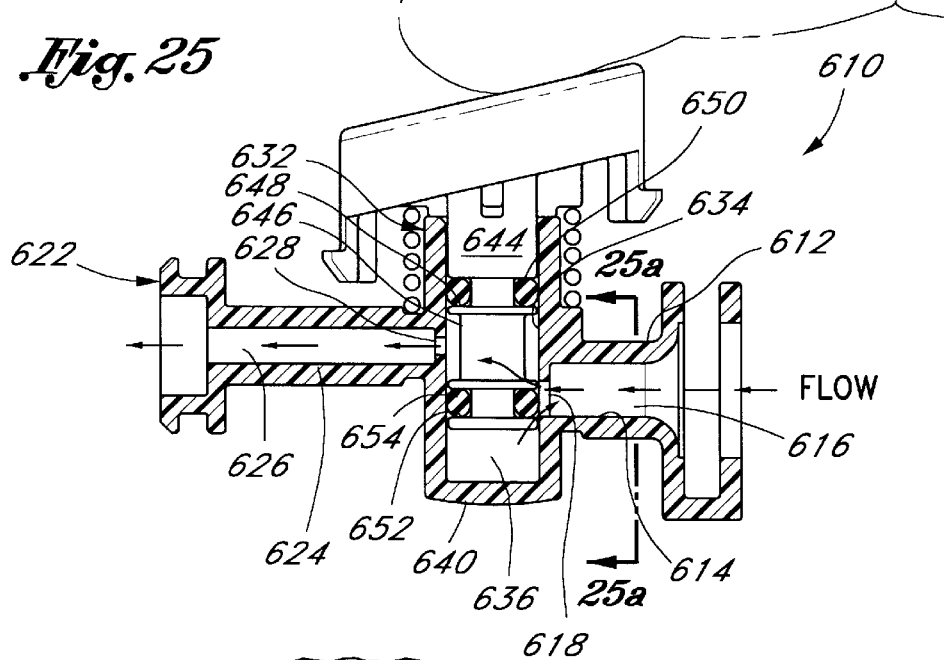
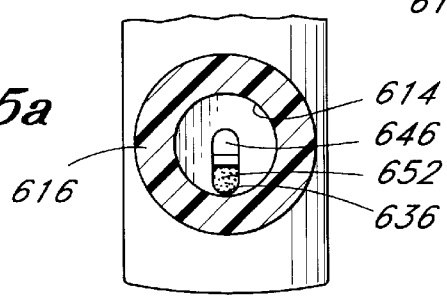

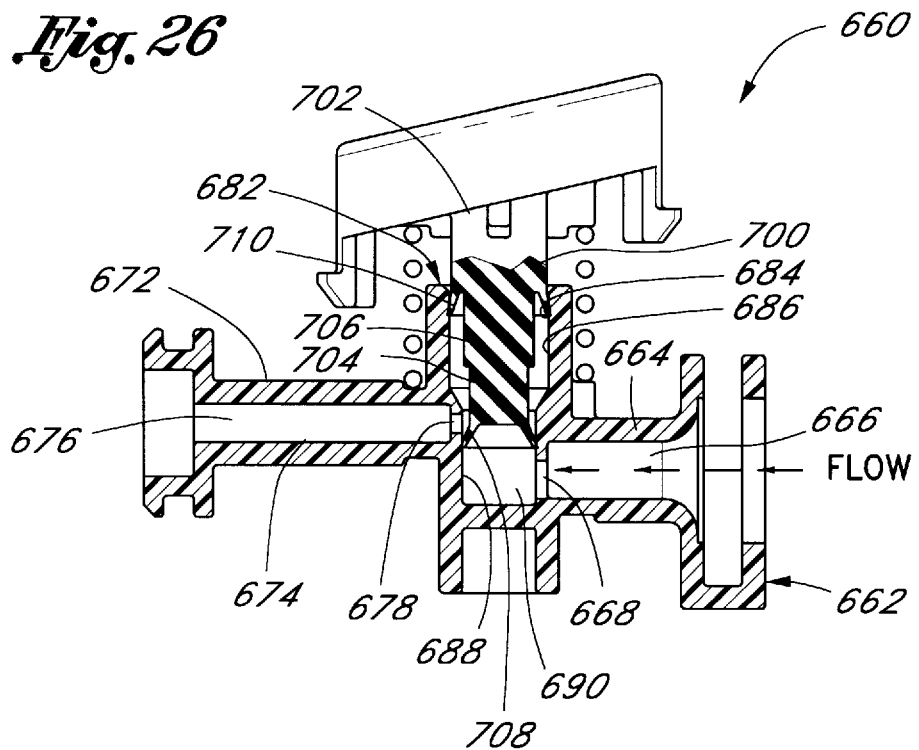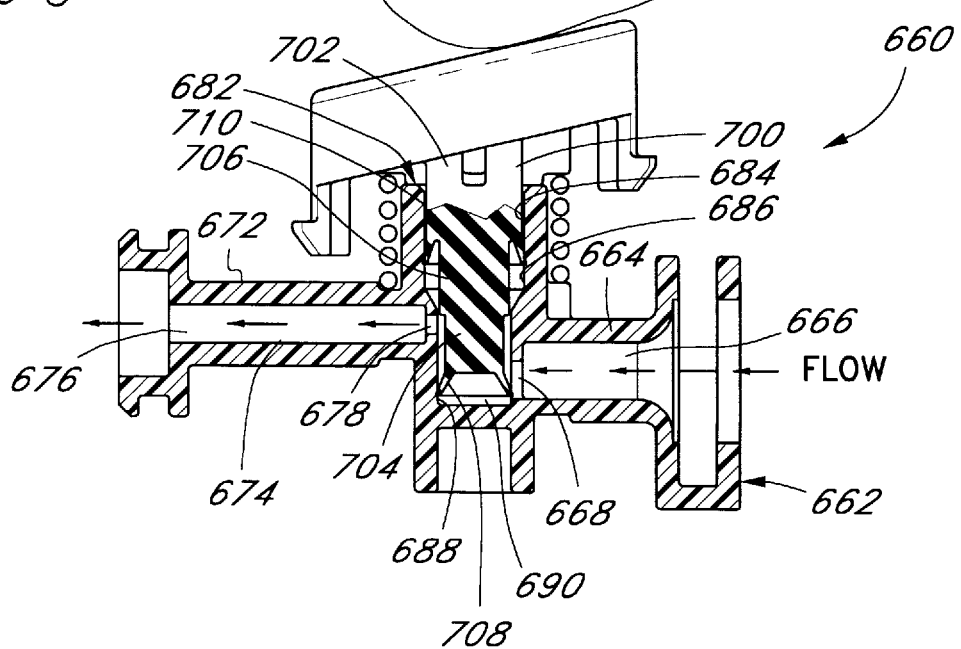

PUMP ASSEMBLY WITH BAYONET LOCK

RELATED APPLICATIONS

This application is a continuation-in-part of U.S. patent application Ser. No. 08/812,790, pending, filed Mar. 6, 1997.

FIELD OF INVENTION

This invention relates to pumps and, in particular, to nonaerosol pump sprayers.

BACKGROUND AND SUMMARY OF THE INVENTION

Noncontainer pressurizing pump sprayers commonly utilize an integral cylinder and plunger arrangement to generate pressure to expel liquid, such as insecticide and fertilizer from a container. Noncontainer pressurizing pump sprayers are desirable in that they do not utilize pressurized containers which must be handled carefully and at controlled temperatures to avoid the risk of explosion. Noncontainer pressurizing a pump sprayers have a number of other advantages, including not using propellants which destroy the ozone and being relatively inexpensive.

There are two common varieties of noncontainer pressurizing pump sprayers: pump sprayers that are pressurized on the upstroke and pump sprayers that are pressurized on the downstroke. Pump sprayers that are pressurized on the downstroke typically utilize a return spring which biases the plunger upward after the pressurization stroke. These sprayers suffer from the drawback that it is often undesirable to store or ship the pump sprayer with the plunger in the up position. Accordingly, the pump sprayer is generally shipped and stored with the return spring in a compressed position, causing the spring to fatigue and begin to wear out prematurely. Likewise, in the event of the inadvertent release of the return spring, the plunger cannot be depressed without pressurizing the fluid in the container. In the case of insecticide or other toxic chemicals, this is often undesirable.

While pump sprayers that are pressurized by pulling the plunger upward have the advantage of not having the plunger being forced outward inadvertently, they too, suffer from a number of drawbacks. For example, once the plunger is drawn upward, it is generally not possible to lower the plunger without discharging fluid. As drawing the plunger upward creates a relatively large volume of pressurized liquid, this either requires that a relatively large amount of fluid be wasted or the device be stored with the plunger extending outward.

U.S. Pat. No. 4,174,055, to Capra, et al., discloses an alternative dispenser. The disclosed dispenser incorporates a plunger which pressurizes the fluid on the upstroke, but also is provided with a separate return spring and collar for purposes of lowering the plunger handle independently of the main plunger piston. While this arrangement has advantages, it is more complicated and expensive than other pump sprayer arrangements. Further, while the system provides for slow bleeding off of pressure, the sprayer remains in a pressurized state for some time. Significantly, this substantially increases the risk of inadvertent discharge of chemicals by adults or children who may come into contact with the device.

The present invention includes an apparatus and pump attachment particularly adapted to form a noncontainer pressurizing pump sprayer which overcomes the drawbacks of the prior art. The apparatus desirably includes an attachment having a pump sprayer which is pressurized on the upstroke, enabling the sprayer to be shipped and stored in a relaxed position. Importantly, however, the plunger is adapted to permit the plunger to be quickly and easily lowered and the apparatus depressurized without discharging fluid. Significantly, these advantages are provided in a apparatus which is particularly adapted to be inexpensively manufactured and includes few moving parts, to enhance reliability.

One aspect of the invention is a pump attachment for a container defining a neck including a body, a coupling, a shaft, a piston, an inlet valve and a biasing member. The body defines an elongate chamber having a first end, a second end, and an interior wall extending between the first end and the second end. The coupler is sized and shaped to secure the body to the neck of a container. The shaft extends through the opening in the first end of the chamber and defines an internal flow channel. The piston is reciprocally mounted within the chamber and defines an inner annular surface surrounding the shaft and an outer annular surface sized and shaped to form a sealing engagement with the interior wall of the body. The piston separates the chamber into an upper portion above the piston and lower portion below the piston. The inlet valve is at the second end of the body and is configured to permit the flow of fluid into the chamber and restrict the flow of fluid out of the chamber. The biasing member is positioned between the piston and the first end of the chamber.

The attachment defines a first sealing surface substantially fixed with respect to the piston and a second sealing surface substantially fixed with respect to the shaft. The first sealing surface and the second sealing surface have a first position wherein the first sealing surface and the second sealing surface cooperate to prevent the flow of liquid between the piston and the shaft. The first sealing surface and the second sealing surface have a second position wherein the first sealing surface and the second sealing surface permit the flow of liquid between the piston and the shaft.

Advantageously, the shaft includes an outwardly extending surface which prevents the piston from sliding beyond the one end of the shaft. Likewise, the attachment desirably includes a first O-ring mounted on the shaft which defines the second sealing surface and an inwardly tapered seat which defines the first sealing surface. Alternatively, the piston may comprise one piece and define an upper outer annular surface sized and shaped to form a sealing engagement with the interior wall of the body and a lower outer annular surface sized and shaped to form a sealing engagement with the interior wall of the body. Desirably, the upper outer annular surface is defined by an upper lip adapted to flex outward in response to downward pressure and the lower outer annular surface is defined by a lower lip adapted to flex outward in response to upward pressure.

The attachment may also include a spray nozzle communicating with the internal flow channel and an actuator for selectively preventing the flow of a fluid through the spray nozzle.

The attachment desirably includes a handle secured to the shaft and a latch movable between a first location wherein the latch generally prevents the shaft from being drawn through the first end of the body and the second location wherein the latch generally permits the shaft to be drawn through the first end of the body. Alternatively, the handle is integrally formed with the shaft so as to form a single piece plunger, thereby eliminating a potential leak point.

Another aspect of the invention is an apparatus including a container defining a neck and an attachment. The attachment includes a body, a coupler, a shaft, a piston, an inlet valve, and a biasing member. The body defines an elongate chamber having a first end, a second end and an interior wall extending between the first end and the second end. The coupler is sized and shaped to secure the body to the neck of the container. The shaft extends through an opening in the first end of the chamber and defines an internal flow channel. The piston is reciprocally mounted within the chamber and defines an inner annular surface surrounding the shaft and an outer annular surface sized and shaped to form a sealing engagement with the interior wall of the body. The piston separates the chamber into an upper portion above the piston and a lower portion below the piston. The inlet valve at the second end of the body is configured to permit the flow of fluid into the chamber and restrict the flow of fluid out of the chamber. The biasing member is positioned between the piston and the first end of the chamber.

The attachment includes a first sealing surface substantially fixed with respect to the piston and a second sealing surface substantially fixed with respect to the shaft. The first sealing surface and the second sealing surface have a first position wherein the first sealing surface and the second sealing surface cooperate to prevent the flow of liquid between the piston and the shaft. The first sealing surface and the second sealing surface have a second position wherein the first sealing surface and the second sealing surface permit the flow of liquid between the piston and the shaft.

Another aspect of the invention is a method of arming and disarming a spray apparatus, including a container containing fluid and an attachment mounted thereto having a body defining an elongate chamber, a shaft extending through an opening in the chamber, the shaft defining an internal flow channel, a piston reciprocating mounted in the chamber, a check valve and a biasing member, including (1) moving the shaft in a first direction relative to the body, thereby moving the piston in the direction and drawing fluid from the container into the chamber through the check valve and compressing the biasing member; (2) permitting the biasing member to force the piston against the fluid in the chamber in a second direction pressurizing the fluid; (3) releasing liquid from the chamber through the internal flow channel in the shaft; and (4) moving the shaft in a second direction relative to the body and the piston to release a seal between the piston and the shaft, thereby permitting the flow of fluid between the piston and the shaft depressurizing the fluid.

Another aspect of the invention is a spray nozzle including a grip, a nose having a spray end, a valve housing, a valve and an actuator. The actuator is connected to the valve. The valve housing is mounted within either the grip or the nose. The valve housing defines a closed end, an inlet port and an outlet port. The valve is mounted within the housing and has a flow portion, a first seal on one side of the flow portion and the second seal on the other side of the flow portion. The valve has a first position wherein the valve prevents the flow of fluid between the inlet port and the outlet port, and a second position wherein the valve permits the flow of fluid between the inlet port and the outlet port. The first seal and the second seal are positioned to one side of the inlet port when the valve is in the first position. The first seal and the second seal are positioned on opposite sides of the inlet port and the outlet port when the valve is in the second position. Desirably, the valve comprises a one-piece shaft member and no more than two O-rings.

Yet another aspect of the invention is an assembly for a container. The assembly includes a grip, a coupler sized and shaped to secure the grip to the neck of a container, a plug and an adaptor. The grip includes a handle portion and a stem portion. The handle portion has a first inner wall defining a first flow channel having a first outlet. The stem portion defines a second inner wall defining a second flow channel having a second outlet. The first flow channel and the second flow channel intersect at the outlet of the second flow channel. The plug is mounted within the first flow channel and has a first position wherein the plug prevents fluid flow from the second outlet to the first outlet, and a second position wherein the plug permits fluid flow from the second outlet to the first outlet. The adaptor has an inner section sized and shaped to be inserted into the first flow channel to move the plug between the first position and the second position. Desirably, the plug further includes an inner flow channel through which fluid is flowable when the plug is in the second position. The adaptor preferably comprises a connector for securing a piece of tubing to the handle portion of the grip.

Finally, yet another aspect of the invention is an assembly including a container and a sprayer. The container defines a wall, a first stud and a second stud. Each of the first stud and the second stud include a head portion and a stem portion. The sprayer has a spray end and a wall. The wall defines a first opening and a second opening. Each of the openings includes a first portion wider than the stem portion and narrower than the head portion, and a second portion wider than the head portion so that the head portion of the stud is insertable therethrough. Advantageously, the container includes a seam and the first stud and the second stud intersect the seam. Preferably, the second portion of the opening is positioned closer to the spray end than the first portion of the opening. Desirably, for each of the first stud and second stud, the head portion overhangs the stem portion a first overhang distance on a first side, and a second overhang distance on a second side. At least one of the first overhang distance and the second overhang distance is advantageously at least .015 of an inch.

BRIEF DESCRIPTION OF THE DRAWINGS

These and other aspects of the invention will now be discussed in connection with the accompanying drawings, which form a part hereof.

FIG. 1 is a vertical sectional view of an apparatus including a pump attachment, in accordance with a preferred embodiment of the invention, showing the parts in their normal at-rest position.

FIG. 2 is a vertical sectional view of the device of FIG. 1, showing the actuator moved to an upwardly or outwardly telescoped position relative the container in order to move the piston in the accumulating chamber or reservoir to compress the biasing member and pressurize fluid within the chamber.

FIG. 3 is a sectional view taken along 3—3 of FIG. 2, illustrating the latch in an unlocked position.

FIG. 4 is a sectional view similar to FIG. 3, but illustrating the latch in a locked position.

FIG. 7 illustrates the pump attachment in its fully locked and retracted position quickly depressurizing through the flow of fluid between the shaft and the piston.

FIG. 8 is a view similar to FIG. 6a illustrating a first alternative piston design.

FIG. 11 is a sectional view of an alternative handle and shaft design, where the handle and shaft are integrally formed.

FIG. 15 is a front elevational view of a preferred apparatus including a cutout illustrating the manner in which the sprayer is mounted on the container.

FIG. 16 is a left side view of the container of FIG. 16, without the spray attachment mounted thereon.

FIG. 18 is a top plan view of an alternative sprayer.

FIG. 19 is a front elevational view of the sprayer of FIG. 18.

FIG. 20 is a sectional view of the sprayer of FIG. 18 taken along 20—20.

FIG. 21 is a sectional view of the sprayer of FIG. 19 taken along 21—21.

FIG. 24 is a partial sectional view of an alternative valve mechanism in a closed position.

FIG. 25 is an enlarged partial sectional view of the sprayer of FIG. 24 in an open position.

FIG. 25a is an enlarged sectional view along 25a—25a of FIG. 25.

FIG. 26 is an enlarged partial sectional view illustrating a second alternative embodiment of the valve mechanism of a sprayer in a closed position.

FIG. 27 is a partial sectional view of the valve of FIG. 26 in an open position.

DETAILED DESCRIPTION OF THE PREFERRED EMBODIMENTS

Figure 1A:
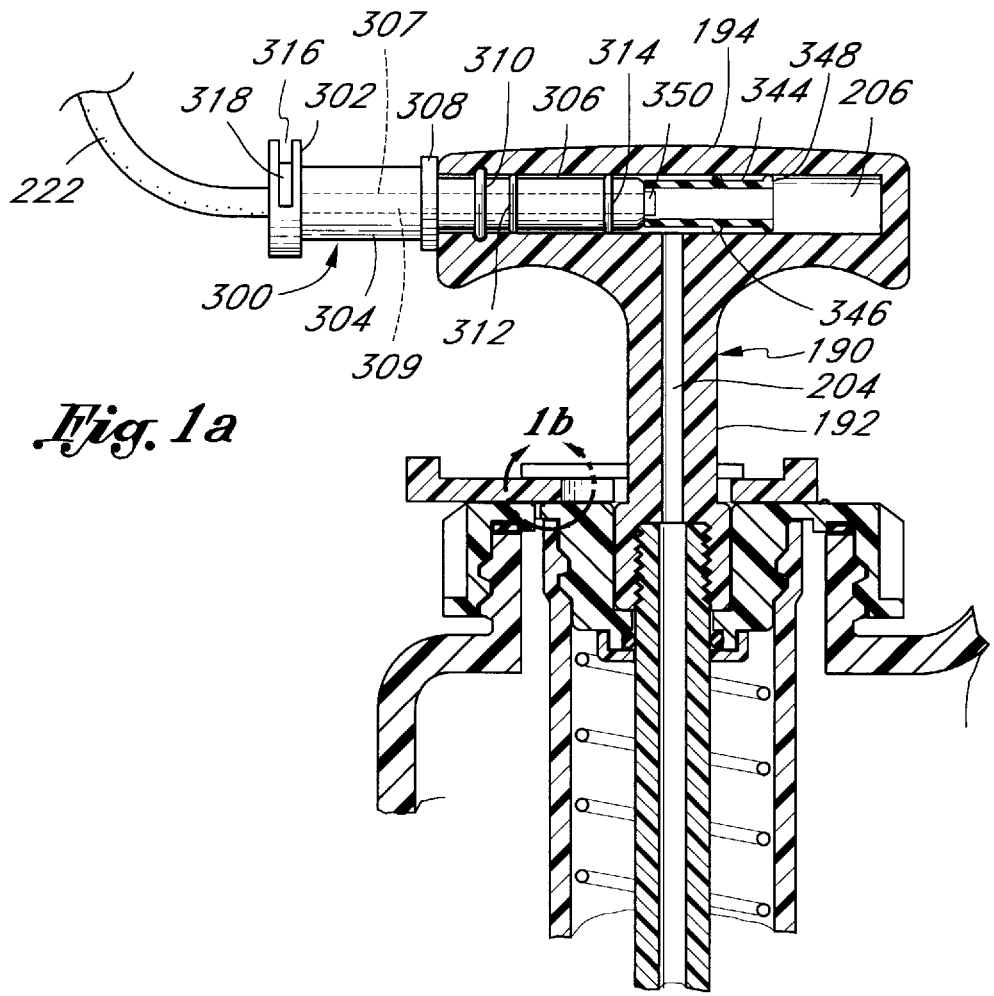
FIG. 1a is an enlarged sectional view of the area with the circle 1a—1a of FIG. 1.
Figure 1B:
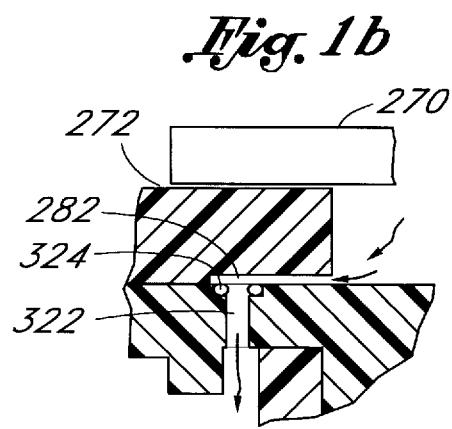
FIG. 1b is an enlarged sectional view of the area within the circle 1b—1b of FIG. 1a, illustrating an open vent passage.

Referring now to FIG. 1, an assembly 10 will now be described. The assembly 10 includes a container 20 and pump attachment 30. The container 20 is illustrated partially filled with fluid 260. The container 20 defines an internal space or reservoir 22 and a neck 24 which defines an opening or port 26. The neck 24 desirably defines a series of external threads 28.

The attachment 30 includes a body 40, which is secured on the container 20 by means of a coupler 70. The attachment further includes a shaft 110 which is connected to a piston 130. A handle 190 is mounted on the shaft 110. A wand or spray nozzle 220 is connected to the handle 190 by tubing 222. Advantageously, the nozzle 220 includes a release valve, which controls the flow of fluid through the spray nozzle 220 and an actuator 240 for controlling the release valve.

Figure 5:
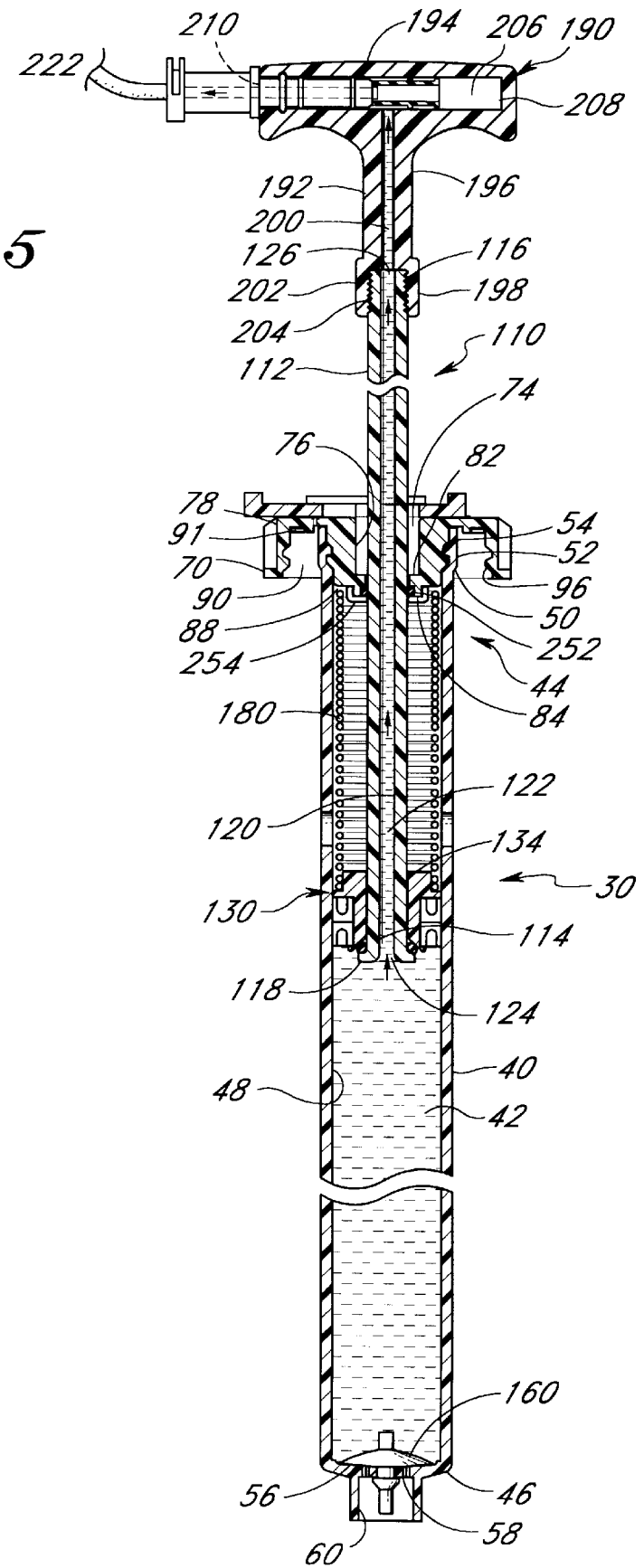
FIG. 5 is a partial sectional view illustrating the pump attachment in a fully pressurized position.

Referring to FIG. 5, the body 40 of the attachment 30 will now be described in detail. The body 40 defines an internal chamber 42. The body 40 includes first or upper end 44, a second or lower end 46 and a cylindrical internal wall 48. The upper end 44 of the body 40 includes an outwardly tapering portion 50 and an upper cylindrical flange 52, provided with internal threads 54. The lower end 46 of the body 40 is provided with an annular overhanging lip 56 defining a series of openings 58 and a depending flange 60 extending downward from the annular lip 56 surrounding the opening 58.

Referring to FIGS. 3–4 and 5, the coupler 70 includes a disk-shaped base 72 which partially defines a central aperture 74. A coupler 70 includes a pair of depending and concentric annular lips. The first or inner annular lip 76 likewise partially defines the aperture 74. The second or outer annular lip 78 is spaced from and surrounds the inner annular lip 76.

The inner annular lip 76 defines an overhanging flange 82 and a depending ridge 84. The inner lip 76 and the overhanging flange 82 cooperate to define a handle seat. The overhanging flange 82 and depending ridge 84 cooperate to define an inner O-ring seat. The first annular lip 76 and the depending ridge 84 likewise form an outer annular spring groove 88. The inner annular lip 76, the base 72 and outer annular lip 78 cooperate to define a first annular channel 90. Which defines a seat which receives an O-ring 91. The outer annular lip 78 is provided with internal threads 96.

Alternatively, the flange 52 of the body 40 could be provided with external threads and the lip 76 of the coupler 70 with internal threads. This arrangement would facilitate tooling to form the body.

The shaft 110 has a first or upper end 112 and a second or lower end 114. The upper end is provided with external threads 116. The lower end 114 of the shaft 110 advantageously includes a radially outward extending portion 118. The shaft includes an internal wall 120 which defines an internal flow channel 122 having a lower inlet end 124 and an upper outlet end 126.

Figure 6:
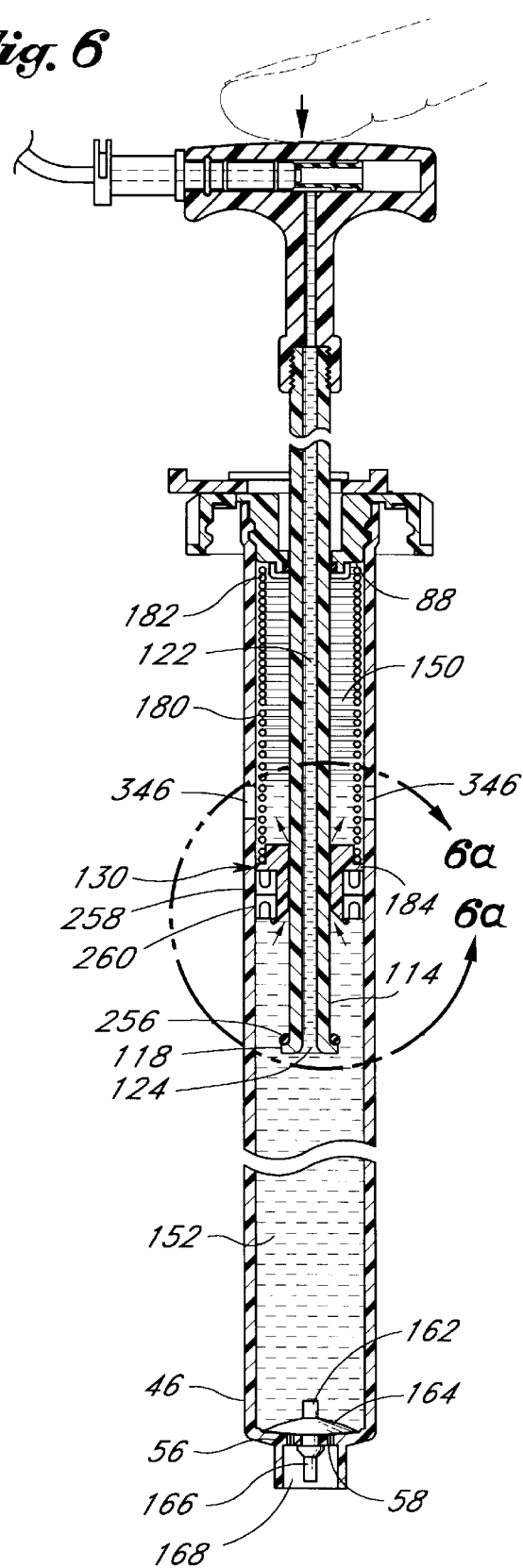
FIG. 6 is a partial sectional view illustrating the release of pressure in the chamber by means of an external downward force on the handle.
Figure 6A:
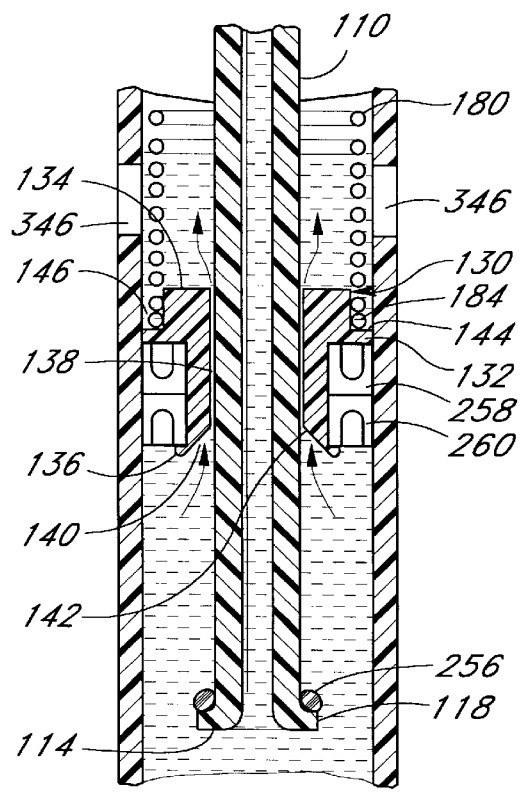
FIG. 6a is an enlarged sectional view of the area 6a—6a of FIG. 6 illustrating the flow of fluid between the outer surface of the shaft and the inner annular surface of the piston.

Referring to FIGS. 6 and 6a, the piston 130 is mounted around the shaft 110. The piston includes a body 132 having a top 134 and bottom 136. The piston defines an inner annular surface 138, which defines an internal channel 140. The inner annular surface 138 desirably defines a tapering portion 142. The piston 130 desirably additionally includes a series of radially extending locating ribs which define a series of upper surfaces 144. These surfaces 144 cooperate to define an outer annular groove 146 for receiving the biasing member 180.

Referring to FIGS. 5 and 6, the piston 130 divides the internal chamber 42 of the body 40 of the attachment into a first or upper portion 150 and a second or lower portion 152. Mounted within the opening 58 defined by the overhanging lip 56 of the lower end 46 of the body 40 is the inlet or check valve 160. The check valve 160 permits the flow of fluid into the internal chamber 42 of the body 40 of the attachment, while preventing the flow of fluid out of the internal chamber 42. Advantageously, the check valve 160 is provided with an upper nipple 162 which mates with the inlet 124 of the shaft. The lower nipple 166 secures the check valve 160 in place. Likewise, the check valve is provided with a lower nipple 166 depending from the overhanging lip 56 of the lower end 46 of the body 40. The check valve defines a central flow channel 168.

The biasing member 180 has a first or upper end 182 which is seated in the outer annular spring groove 88 of the coupler and a second end 184 which is seated in the annular groove 146 in the top of 134 of the piston 130.

Referring to FIG. 5, the handle 190 is mounted on the upper end 112 of the shaft 110. The handle includes a vertical stem 192 and a grip or horizontal portion 194. The horizontal portion is desirably integrally formed with an upper end 196 of the stem 192 and the lower end 198 of the stem 192 is desirably secured to the upper end 112 of the shaft 110. The stem desirably defines an internal flow channel 200. The lower end 198 of the stem 192 desirably defines a larger mouth portion 202 which defines internal threads 204 with the external threads of 116 on the upper end 112 of the shaft 110. The horizontal portion 194 desirably likewise defines an internal flow channel 206 which communicates with the internal flow channel 200 of the stem 192, and includes a closed end 208 and an open end 210.

Referring to FIGS. 1 and 1a–1d, the attachment of the tubing 222 to the horizontal portion 194 of the handle 190 will now be described. To ensure a fluid-tight seal, the tubing 222 is locked to a connector or 300 and the adaptor 300 is locked to the horizontal portion 194 of the handle 190. As seen in FIG. 1a, the adaptor 300 has a disc-shaped outer section 302, a cylindrical intermediate section 304 and a smaller diameter cylindrical inner section 306. A cylindrical wall 307 defines an interior flow channel 309 running the length of the adaptor. The intermediate section 304 includes an enlarged annular stop 308 proximate to the inner section 306. The inner section 306 includes an annular locking flange 310 which mates with a corresponding annular detent in the horizontal portion 194 of the handle 190. The inner section 306 further comprises a first sealing ring 312 and a second sealing ring 314 spaced inward from the locking flange and sized to form a fluid-tight seal with the wall defining the internal flow channel 206 of the horizontal portion 194 of the handle 190. The outer section 302 defines a pocket 316 for receiving a locking ring 318. As best seen in FIG. 1e, the locking ring 318 defines a plurality of gripping edges or corners 320, which are adapted to apply pressure against the outer surface of the tubing 222 and prevent it from being inadvertently pulled from the adaptor 300.

FIG. 11 shows an integrally formed one-piece handle and shaft or plunger 424 which may be used in place of the two-piece handle and shaft described above. The integral plunger 424 would eliminate a possible leak point between the handle and shaft. The plunger 424 includes a shaft portion 426 and a handle portion 428 which are joined at a stop collar 430. The handle portion 428 includes as vertical stem section 432 and a horizontal grip section 434. The shaft portion 426 of the plunger 424 includes an internal wall 436, which mates with a plug 438. The plug includes an insert portion 440 which is received within the shaft portion 426 and an exterior portion 442 which protrudes outside of the shaft portion 426. The insert portion 440 includes a radially extending annular ridge 444 which mates with an annular recess 446 in the internal wall 436 of the shaft portion 426.

Alternatively, it may be desirable to provide external threads on the distal end of the shaft portion 426 and an alternative plug with internal threads to mate therewith. This would eliminate the need for the annular recess 446 in the inner surface of the shaft which could facilitate the molding of the plunger 424.

Illustrated in FIG. 11a is an alternative adaptor or connector 850 secured within the handle portion 428 of the one piece plunger 424. The connector 850 has a larger diameter head portion and a smaller diameter body portion. Importantly, the connector 850 avoids the use of a locking ring. The elimination of the locking ring facilitates the quick and easy attachment of the connector 850 to the plunger 424, while an added O-ring 852 adjacent to the inner end of the head portion prevents leaks.

FIG. 11a also illustrates an alternative plug 860 for blocking the flow channel through the stem section 432 of the handle portion 428. The plug 860 is similar to the plug 344, with the exception that the plug is solid and does not incorporate a second sealing flange. The solid plug has greater strength and the elimination of the second sealing flange reduces binding.

To ensure proper operation of the assembly 10, the assembly includes a number of additional sealing members, which will now be described. A first seal or O-ring 252 is mounted at the upper end 44 of the attachment 30 within the inner O-ring seat defined by the first annular lip 76 and overhanging flange 82 out of the coupler 70. The first O-ring 252 is secured within the seat by means of an annular retaining clip 254 which desirably surrounds the depending ridge 84. Referring to FIGS. 6 and 6a, a second seal or 0-ring 256 surrounds the second end 114 of the shaft 110 and desirably abuts against the radially outward extending portion 118 of the shaft 110. To ensure that the piston 130 forms a sealing engagement with the internal wall 48 of the body 40 of the attachment 30, the piston 130 is desirably provided with a first and a second sealing gasket or cup seals, 258 and 260, respectively. Specifically, the body 132 of the piston 130 desirably defines an annular space between the bottom 136 of the piston and the portion of the body 132 which defines the outer annular surface 144 and the gaskets 258 and 260 are resiliently secured to the body 132 filling the space. The gaskets 258 and 260 ensure that the piston 130 forms a fluid-tight seal with the internal wall 48 of the body 40 and prevent flow between the gaskets 258 and the external wall of the piston body.

FIG. 8 shows an alternative piston design which may be desirable to avoid the need for relatively expensive cup seals. Specifically, the piston 400 defines an outer generally cylindrical surface 402 which is bisected by an annular triangular groove 404 which receives a sealing member or O-ring 406. The O-ring 406 ensures a fluid-tight seal between the piston 400 and the internal wall of the body of the attachment.

Figure 9A:
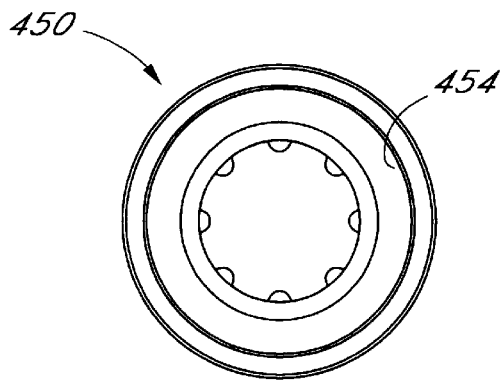
FIG. 9a is a top plan view of the piston of FIG. 9.
Figure 9:
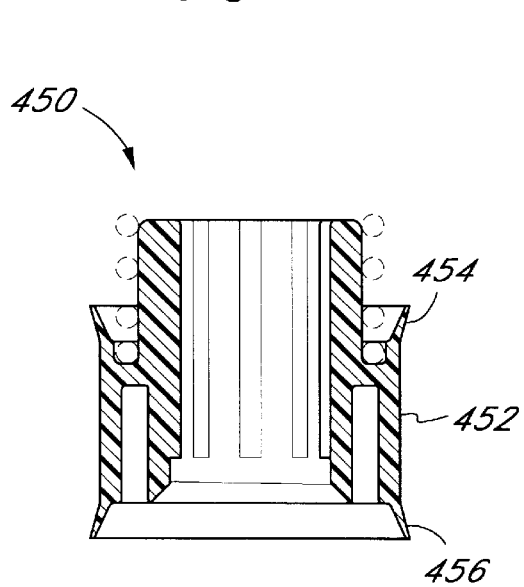
FIG. 9 is an enlarged sectional view of a second alternative piston design.
Figure 9B:
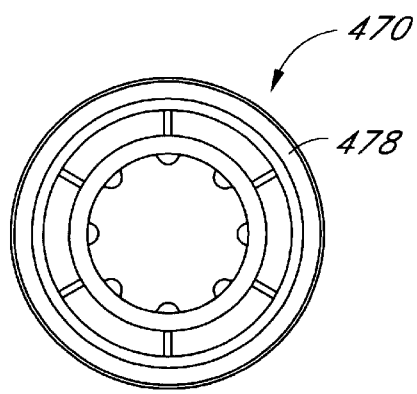
FIG. 9b is a bottom plan view of the piston of FIG. 10.
Figure 12:
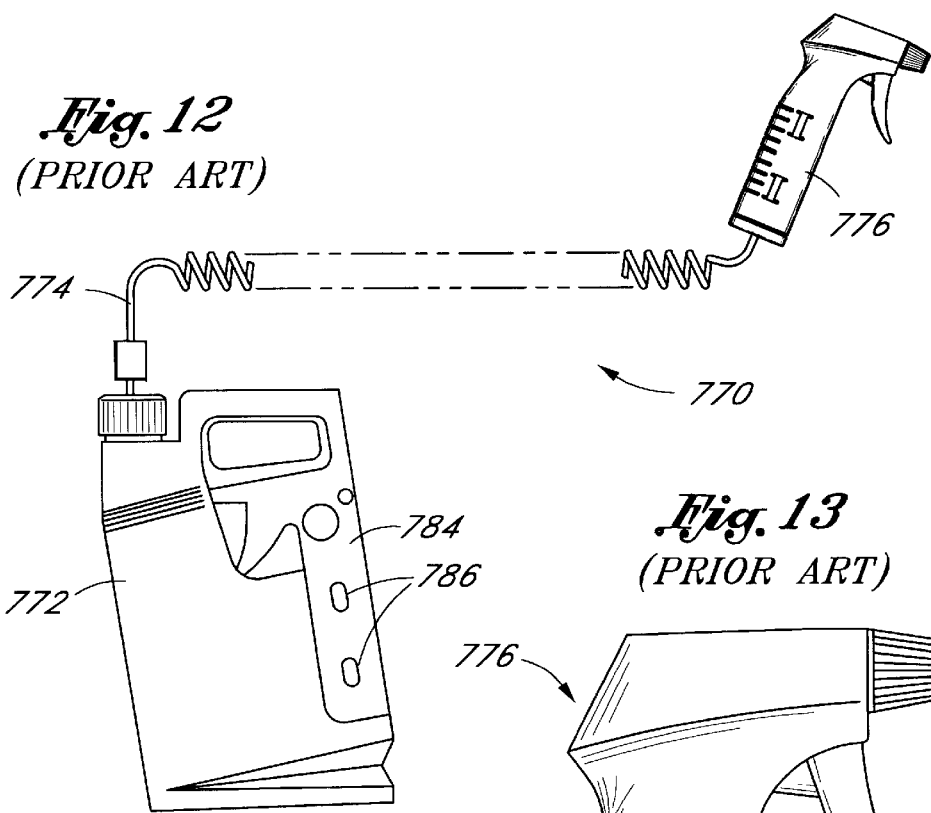
FIG. 12 is a perspective view of a prior art container and sprayer assembly.
Figure 13:
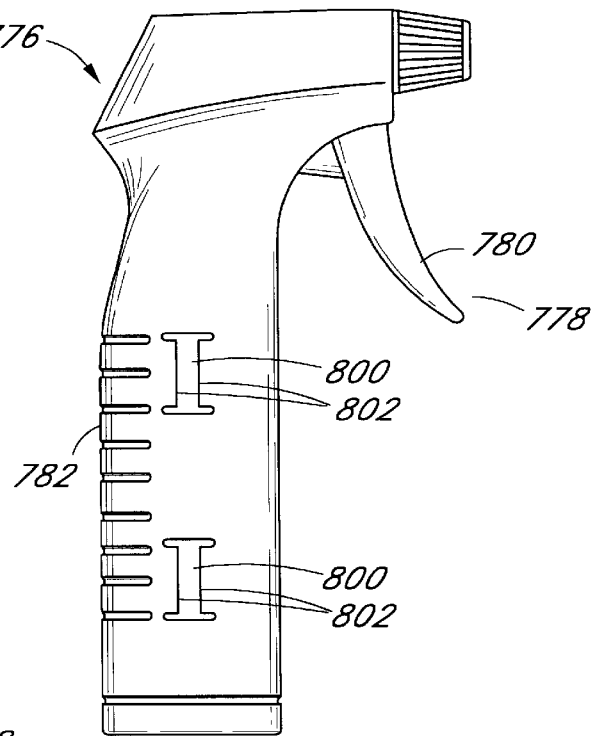
FIG. 13 is an enlarged view of the sprayer of the assembly of FIG. 12.

Referring now to FIGS. 9, 9A and 9B, there is shown a second alternative piston 450 which may be desirable to avoid the need for separate seals. The piston 450 defines an outer cylindrical surface 452, an upper annular lip 454, and a lower annular lip 456. Advantageously, use of this piston 450 avoids the need for a separate O-ring seal and reduces the stacking of tolerances. Specifically, in designs using separate O-rings, it is required to maintain the tolerance of the inner wall of the body, the external cylindrical wall of the piston, and the O-ring itself. By eliminating the use of the separate O-rings, it is only necessary to maintain the tolerances of the piston 450 and the inner wall of the body 40.

Figure 10:
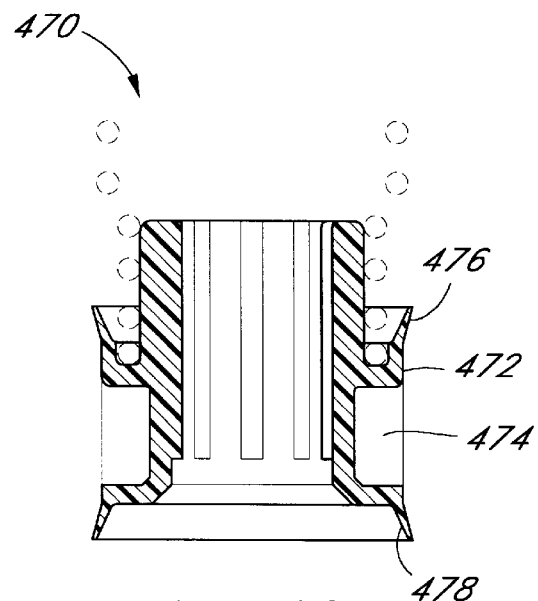
FIG. 10 is an enlarged sectional view of a third alternative piston design.

FIG. 10 shows a third alternative piston design 470. The piston 470 defines an outer cylindrical surface 472, an intermediate recess 474, an upper annular foot 476 and a lower annular foot 478. Other than the intermediate recess, the piston 470 is similar to the piston 450. The intermediate recess 474 has the advantage of providing a piston with uniform wall thickness and a piston which requires less material to manufacture.

Figure 1C:
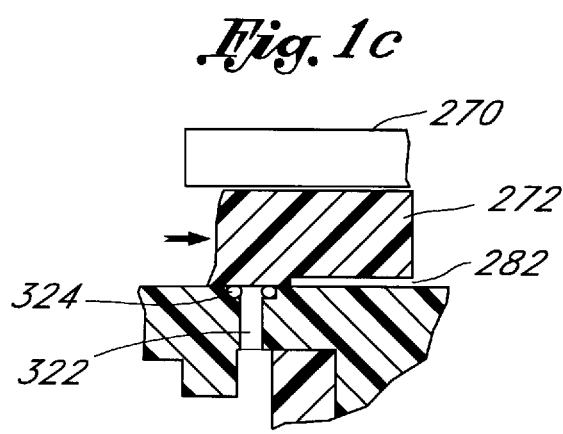
FIG. 1c is an enlarged sectional view similar to FIG. 1b, but illustrating a closed passage.

The assembly 10 is desirably provided with a mechanism for locking the handle in a fully retracted position. Referring to FIGS. 1, 3 and 4, the coupler 70 desirably defines a pair of parallel L-shaped overhanging flanges 270. The flanges 270 are sized and shaped to permit a locking plate 272 to slide snugly between the flanges 270. The locking plate includes a first end 274 and a second end 276. The first end 274 defines a first grip portion 278 and the second end 276 defines a second grip portion 280. Desirably, the locking plate defines a vent passage 282 which cooperates with a corresponding vent opening 322 in the base 72 of the coupler 70, when the locking plate is in its unlocked position. Surrounding the top of the vent opening 322 is a sealing member 324, such as an O-ring to prevent leakage of fluid when the locking plate 272 is in its locked position, as shown in FIG. 1c.

The locking plate 272 defines an aperture 284 including a first smaller portion 286 defined by first edge 288 sized and shaped to snugly receive the portion of the stem 192 of the handle 190 above the larger mouth portion 202. The aperture 284 further includes a larger second portion 290 defined by a second edge 292 which is sized and shaped to permit the free movement of the larger mouth portion 202 of the stem 192 of the handle 190 therethrough.

Referring to FIG. 3, the base 72 of the coupler 70 desirably defines a raised dimple 325 positioned to abut the outer edge of the locking plate 272 to keep the locking plate from sliding when the locking plate 272 is in the open position. Advantageously, the locking plate 272 is provided with a mating detent 326 to receive and retain the dimple 325 when the locking plate is in the closed position shown in FIG. 4.

Referring to FIGS. 18–21, a sprayer 500 for use in connection with assembly will now be described in detail.

The sprayer 500 includes a generally cylindrical grip 502, a narrow nose 504 having a generally plus-shaped cross-section and a spray end 506. Advantageously, a separate spray piece 508 is provided to permit the spray to be adjusted.

The sprayer 500 includes an actuator 510 surrounded by a thumb rest 512 (FIG. 19). As best seen in FIG. 21, the grip 502 of the sprayer 500 defines a pair of openings 514. Each opening is defined by a first generally c-shaped wall defining a larger portion of the opening 518 and a second c-shaped wall 520 defining a smaller portion of the opening 522.

The grip 502 also defines a slot 530 for receiving the connector 850. The connector 532 is connected by a length of tubing 534 to a valve housing 550. Advantageously, the tubing 534 is wrapped around a valve housing to prevent any pulling on the tubing 534 from disconnecting the link tubing 534 from the valve housing 550.

Figure 22:
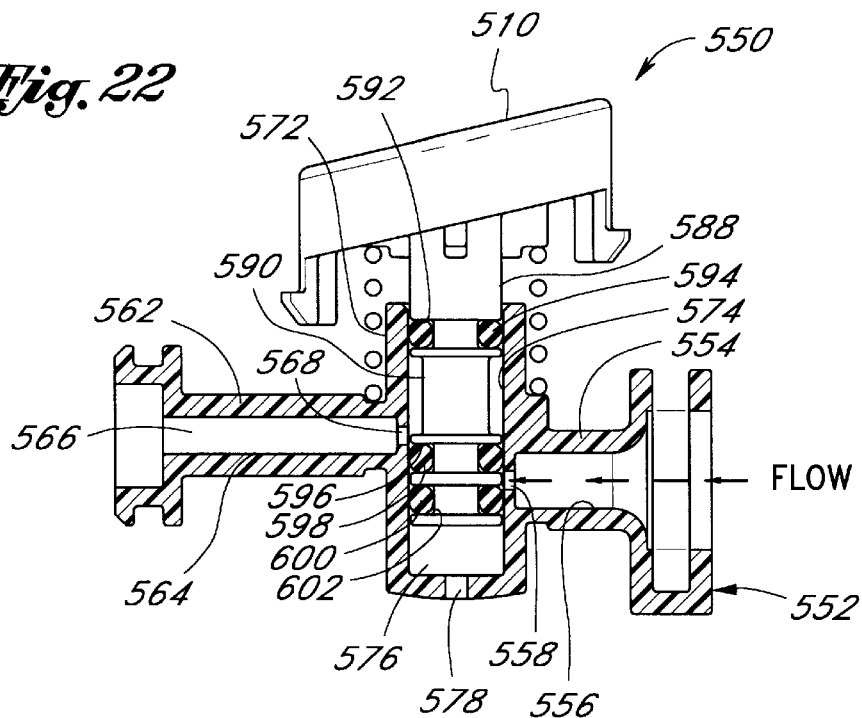
FIG. 22 is an enlarged partial sectional view of the valve mechanism of a sprayer in a closed position.
Figure 23:
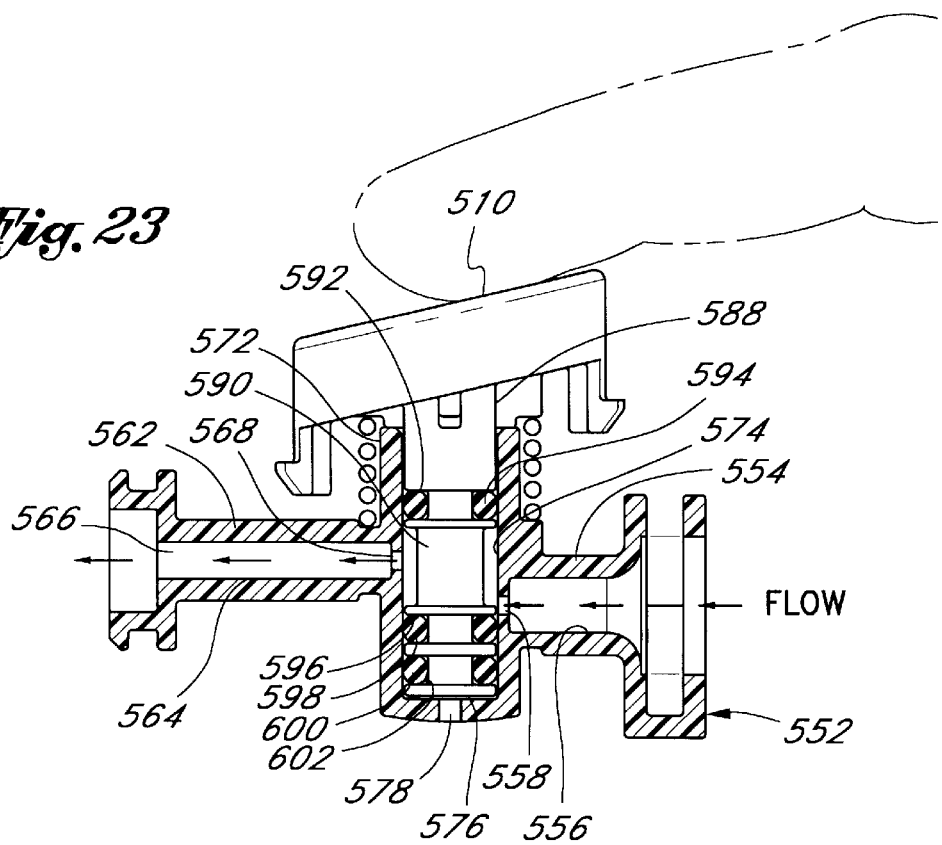
FIG. 23 is a partial sectional view of the valve mechanism in an open position.

As best seen in FIGS. 22–23, the valve housing 550 includes an inlet portion 552 including a first wall 554 which defines an inlet channel 556 and a first port 558. The valve body also includes an outlet portion 562 which includes a second wall 564 which defines an outlet channel 566 which in turn defines a second port 568. The inlet portion 552 and the outlet portion 562 are connected by an intermediate portion 572. The intermediate portion 572 includes a third wall 574 which defines a connecting chamber 576. The third wall further defines a bottom vent port 578. The inlet portion 552 defines a pocket 582 for receiving a locking ring 584 to secure the tubing 534 within the inlet channel 556.

The actuator 510 is connected to and is integrally formed with the valve. The valve has a valve shaft 588 including a narrow portion 590. A first recess 592 is positioned above the narrow portion 590 and receives a first O-ring 594. A second recess 596 is positioned below the narrow portion 590 and receives a second O-ring 598. A third recess 600 is positioned below the second recess and receives a third O-ring 602.

FIG. 22 shows the valve in a off position, with flow entering the inlet portion 552 and seeking to flow into the intermediate portion 572 through the first port 558. Flow, however, is blocked by the second 0-ring 598 positioned just above the first port 558 and the third O-ring 602 positioned just below the first port 558.

FIG. 23 illustrates the valve in a flow through position where the valve shaft 588 has been depressed so that both the second O-ring and the third O-ring are positioned below the first port 558. As such, flow is able to pass through the first port 558 around the narrow portion 590 of the valve shaft 588 through the second port 568 and through the outlet portion 562 of the valve housing 550. Advantageously, the lower vent port 578 prevents fluids from being trapped in the valve body, which otherwise might prevent operation of the valve.

FIG. 24 illustrates a first alternative valve assembly including a valve housing 610 defining an inlet portion 612 having a first wall 614 which defines an inlet channel 616 and a first port 618. The valve housing 610 further includes an outlet portion 622 including a second wall 624 which defines an outlet channel 626 and a second port 628. The valve housing likewise includes an intermediate portion 632 between the inlet portion 612 and the outlet portion 622. The intermediate portion 632 defines a third wall 634 which defines a connecting chamber 636 and a closed end 640. The actuator includes a valve shaft 644 having a narrow portion 646 and a first recess 648 for receiving a first O-ring 650. The valve shaft 644 likewise defines a second recess 652 for receiving a second O-ring 654. FIG. 24 illustrates the valve in a closed position. Flow is prevented from flowing through the assembly by the third wall 634 of the connecting chamber and the second O-ring 654.

FIGS. 25 and 25A illustrate the valve assembly in an open position, with the valve depressed. In this position, the valve shaft 644 is depressed so that a portion of the narrow portion 646 of the shaft is aligned with the first port 618 so that flow through the first port 618 around a narrow portion 646 of the valve shaft 644 and through the second port 628 is permitted. Importantly, fluid is not trapped within the closed end 640 of the valve body 610 because the first port 618 is sized, shaped, and positioned such that in the on position, fluid is permitted to flow not only through the inlet portion 612 above the second O-ring 654 but also from the closed end 640 of the valve body 610 beneath the second O-ring and back into the inlet portion 612 of the valve body. This arrangement prevents fluid from dripping out of the valve body, while at the same time preventing fluid trapped within the closed end of the valve body 610 from preventing proper operation of the valve.

FIG. 26 shows a second alternative valve assembly including an alternative valve housing 660. The valve housing 660 includes an inlet portion 662 having a first wall 664 which defines an inlet channel 666 and a first port 668. The valve housing 660 also defines an outlet portion 672 having a second wall 674 which defines an outlet channel 676 and a second port 678. Positioned between the inlet portion 662 and the outlet portion 672, is an intermediate portion 682. The intermediate portion 682 has a third wall 684 which includes an upper portion 686 and a lower portion 688. The third wall defines a connecting chamber 690.

The valve shaft 700 includes an outer section 702 connected to the actuator, a narrow intersection 704 and an intermediate section 706. The outer section 702 has a larger diameter than the intermediate section 706 and the intermediate section 706 has a larger diameter than the inner section 704. A first sealing flange 710 is positioned between the outer section 702 and the intermediate section 706 of the valve shaft. A second sealing flange 708 is positioned at the distal end of the inner section 704 opposite the outer section 702. Advantageously, the first sealing flange 710 cooperates with the upper portion 686 of the third wall 684 to prevent fluid from passing out of the valve body 660. Similarly, the second sealing flange 708 cooperates with the lower portion 688 of the third wall 684 to prevent fluid from passing therebetween. FIG. 26 illustrates the second alternative embodiment of the valve in a closed position. In this position, flow is permitted through the inlet portion 662 and into the connecting chamber 690, but is prevented from flowing through the second port 678 by the second sealing flange 710. FIG. 27 illustrates the second alternative valve in an open position. In this position, the actuator shaft 700 is depressed and fluid flows through the inlet channel 666 through the first port 668 around the inner section 704 of the actuator shaft 700, through the second port 678 and through the outlet channel 676.

The operation of the apparatus will now be described.

Figure 1D:
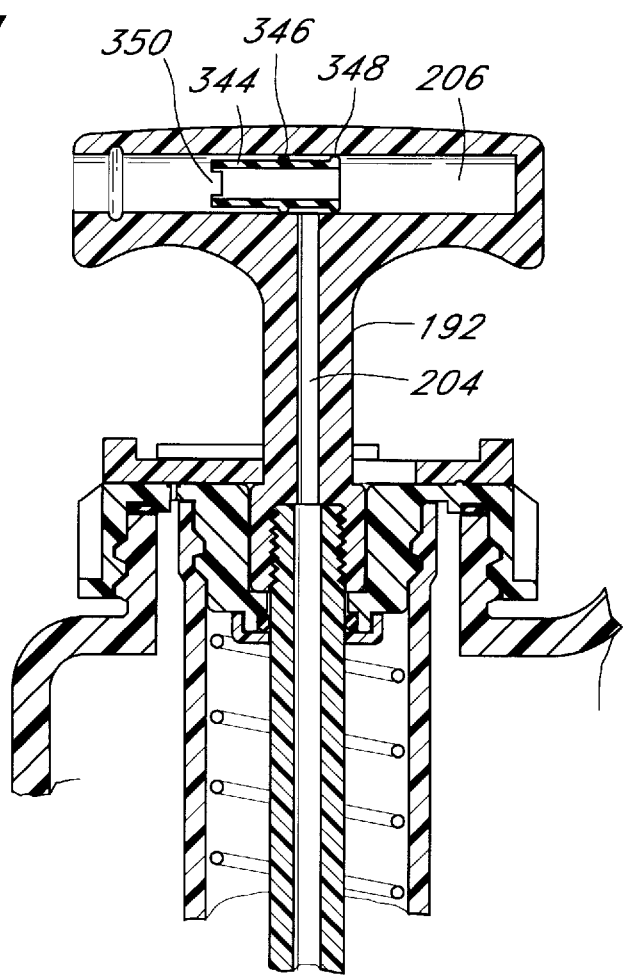
FIG. 1d is an enlarged sectional view similar to FIG. 1a, but showing the handle plug used during shipping.
Figure 1E:
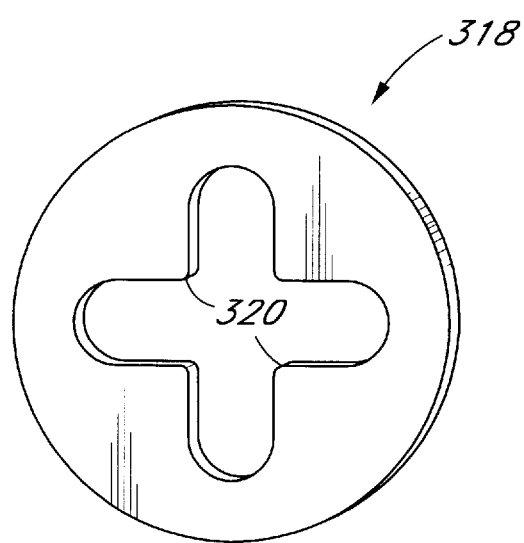
FIG. 1e is an enlarged view of a locking ring used by the adaptor.

Referring to FIG. 1 and 1d, during storage or shipment, the shaft 110 is secured in its fully retracted position, with the shoulder or mouth portion 202 of the handle 190 being retained in position by the locking plate 272. During shipment, the tubing 222 connecting the spray nozzle 222 to the handle 190 may be secured in a hollow portion of the spray nozzle 220. The nozzle 220 is desirably provided with a pair of openings 340 for receiving and retaining a pair of mating studs 342 projecting from the side of the container 20.

Figure 17:
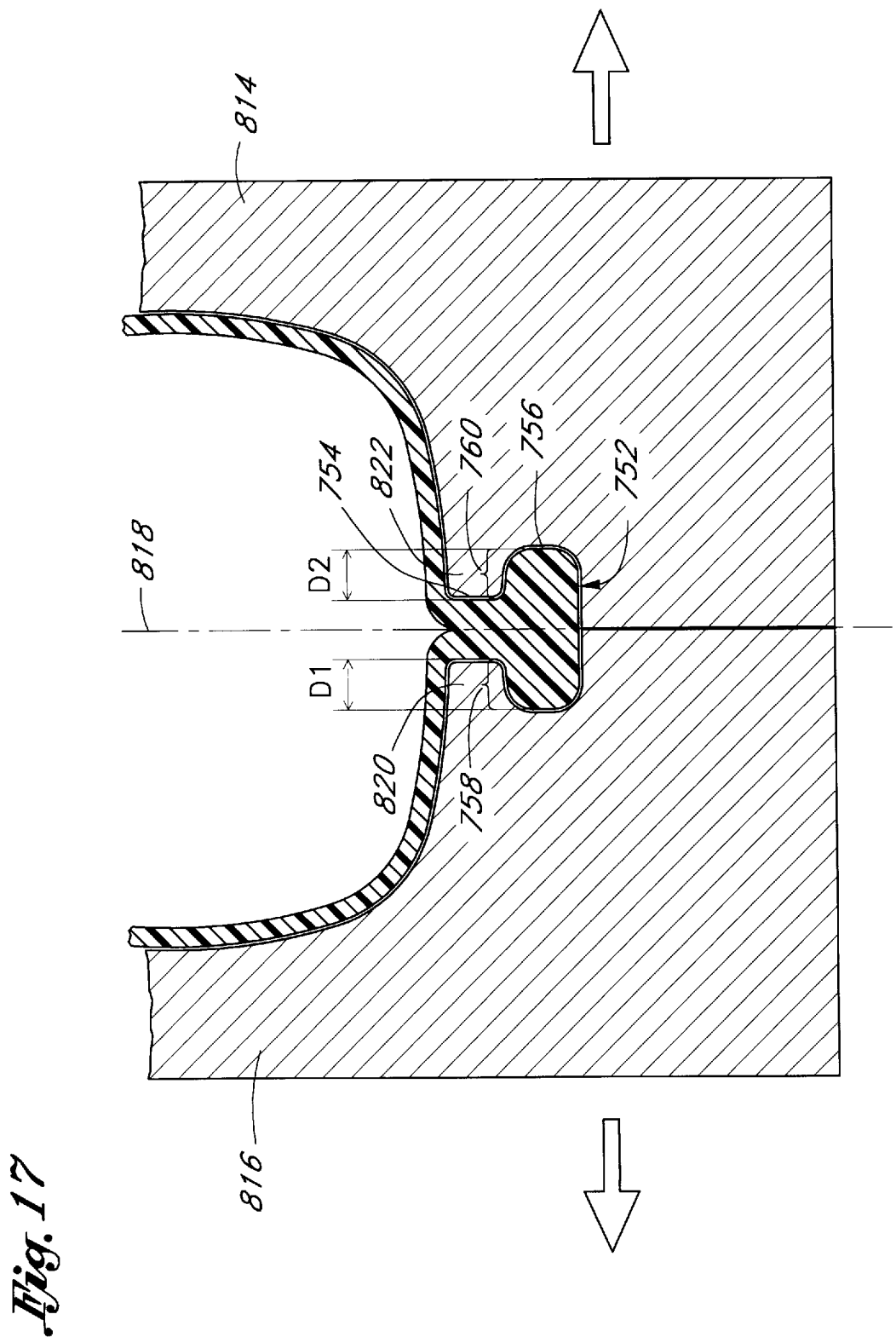
FIG. 17 is an enlarged schematic sectional view illustrating the method of molding the container of FIG. 15, including a bayonet attachment.

FIG. 15 shows an alternative assembly 720 including a container 730, a pump attachment 740 and a sprayer 750. The container includes a pair of studs 752 positioned on the back wall of the container. Each of studs is identically shaped. The assembly 720 is generally the same as the assembly 10, with the exception of the shape of the studs. As shown in FIG. 15, the sprayer 750 is mounted on the container 730 by means of cooperation of the studs 752 and the wall of the sprayer defining the bayonet openings. As best seen in FIGS. 15 and 17, the studs 752 include a stem portion 754 and a taller and wider head portion 756. The head portion defines a first overhang portion 758 which extends beyond the edge of the stem portion 754 a distance D1. Similarly, the head portion 756 defines a second overhang 760 extending beyond the opposite side of the stem portion 754 a distance D2. Advantageously, the distances D1 and D2 are at least .015 inches, and are preferably .025 inches.

This mounting arrangement is superior to the mounting arrangements of prior art in that it facilitates the manufacture of a simple, inexpensive and secure mounting means for the sprayer.

Figure 14:
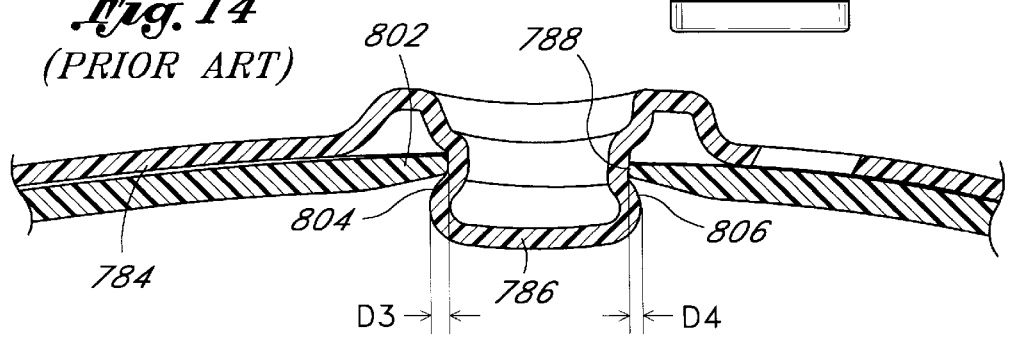
FIG. 14 is a sectional view illustrating the connection between the sprayer and container of FIG. 12, when the sprayer is mounted on the container.

FIGS. 1–14 illustrate a prior art assembly 770 including a container 772, connected by tubing 774 to a sprayer 776. The sprayer includes a nozzle 778, a trigger 780 and a handle 782. The container 772 defines a recess 784 and a sidewall for receiving the nozzle 778, trigger 780 and handle 782 of the sprayer 776. The container 772 defines a pair of generally rectangular raised protrusions 786 which extend outward from the side wall of the container 772. As best seen in FIG. 14, the protrusion 786 defines side grooves 788.

The sprayer 776 defines a pair of I-shaped openings 800 corresponding in location to the location of the protrusions 786 on the container 772. Each I-shaped opening 800 defines a pair of opposing spring tabs 802. As disclosed in U.S. Pat. No. 5,469,993, to Monsanto, the opposing spring tabs 802 are to be resiliently received by the side grooves 788 to secure the sprayer 776 to the container 772 during storage. The '993 patent discloses that the container is preferably made by blow molding. As shown in FIG. 14, the protrusions 786 define a first overhang 804 extending beyond the inner portion of the recess a distance D3 and a second overhang 806 extending beyond the outer surface of the recess a distance D4. Unfortunately, this design is undesirable in that it is very difficult to manufacture the opposing spring tabs 802 of the sprayer 750 and the protrusions 786 of the container 730 to sufficient tolerances that the sprayer can be securely attached to the container 730 in this manner. In an effort to avoid having the sprayer detach from the container during shipment, sprayers of this design have been glued to containers or tied to the containers during shipping. Neither of these approaches was desirable from an aesthetic, cost or functional basis.

Importantly, however, the assembly 720 of the present invention overcomes these drawbacks. The positioning of the studs 752 along the seam line 812 of the container 730 permits the studs 752 to be manufactured with a significantly larger first overhand distance D1 and second overhang distance D2. As a result, the studs, in cooperation with the bayonet openings of the sprayer 750, can secure the sprayer 750 securely to the container 730 during shipment.

The reason that this larger overhang is possible is best understood in connection with FIG. 17 which schematically illustrates the method of manufacturing a container 730. A first mold half 814 and a second mold half 816 are positioned on either side of a break plane 818. Plastic is then blown into the mold to form the container 730. Because the mold halves separate in a direction perpendicular to the break plane, the first mold half 814 can define a first flange 820 which extends beyond the side of the stem 754 a distance approximately equal to D1. Similarly, the second mold half 816 can form a second flange 822 which extends beyond a recess a distance approximately equal to D2.

As shown in FIG. 1d, during shipment the inlet to the internal flow channel 204 of the stem 192 of the handle is blocked by a plug 344 mounted within the internal flow channel 206 of the horizontal portion 194 of the handle. The plug 344 includes first and second sealing flanges 346 and 348 which prevent the flow of fluid between them and the wall forming the internal flow channel 206. The end of the plug 344 facing the open end 210 of the handle 194 defines a cutout 350.

Importantly, the mating of the upper nipple 162 of the check valve 160 with the inlet 124 of the shaft prevents fluid from leaking out the handle during shipment and storage of the assembly 10, prior to use. On the other hand, the plug 344 provides a fail-safe backup in the event the locking plate 272 is moved to the open position and the handle is raised.

When it is desired to use the assembly 10 to dispense fluid 260 from the container 20, the adaptor 300 on the end of the tubing 222 is inserted into the internal flow channel 206 of the horizontal 194 portion of the handle. This causes the inner section 306 of the adaptor 300 to push the plug away from the outlet of the internal flow channel 206 of the horizontal portion of the handle so that the sealing flanges 346 and 348 are pushed beyond the outlet of the internal flow channel 204 of the stem 204, as shown in FIG. 1a. The inner section 306 of the adaptor 300 forms a port with the cutout 350 of the plug 344 through which fluid may flow from the internal flow channel 206 of the horizontal portion 194 of the handle 190 and the interior flow channel 309 of the adaptor 300. The locking plate 272 is then moved from the locked position shown in FIG. 4 to the unlocked position shown in FIG. 3. The grip portion 194 of the handle can then be lifted upward as illustrated in FIG. 2. This causes the second O-ring 256 to press against the tapering portion 142 of the body 132 of the piston 130 creating a fluid-tight seal. This also causes the fluid 260 to be drawn through the check valve 160 into the lower portion 152 of the chamber 42. It is not necessary to draw the handle completely upward. On the other hand, to maximize the amount of fluid that may be dispensed without repressurizing the container, the handle may be drawn to its fully pressurized position as illustrated in FIG. 5. In this position, the spring 180 is fully compressed between the coupler 70 and the piston 130. The handle 190 is then released, allowing the spring 180 to force the piston 130 downward against the fluid 260 in the lower portion 152 of the chamber 42. As the check valve 160 prevents fluid from flowing out of the chamber 42 fluid is forced upward through the inlet end 124 of the internal flow channel 122 defined by the shaft 110. This fluid flows through the internal flow channel 200 of the stem 192 and the internal flow channel 206 of the grip portion 194 of the handle 190. The fluid is likewise forced through the tubing 222 to the spray nozzle 220. Fluid is dispensed from the spray nozzle 220 by depressing the actuator 240 operating the release valve (not shown) for the nozzle 220.

Significantly, the assembly 10 of the present invention permits the quick and easy release of pressure within the pump attachment 30. Specifically, as shown in FIGS. 6 and 6a, the handle 190 can be forced rapidly downward so as to move the second end 114 of the shaft 110 downward relative the piston 130. This causes the second O-ring mounted on the radially outward extending portion 118 of the lower end 114 of the shaft 110 to move downward away from the tapering portion 142 of the inner annular surface 138. This releases a seal between the shaft 110 and the piston 130 and permits fluid 260 to flow through the channel 140 between the inner annular surface 138 of the piston 130 and the outer surface of the shaft 110. This fluid 260 is eventually drained from the upper portion 150 of the body 40 of the attachment through a pair of outlet openings 346.

Importantly, the release of pressure from the body 40 of the attachment 30 prevents fluid from inadvertently being released from the assembly 10 during operation, transport and storage of the apparatus. Further, as illustrated in FIG. 7, this release of pressure permits the shaft 110 to return to its fully retracted position so that the mouth portion 202 of the handle can be received within the aperture 74 in the coupler 70 against the coupler 70 and locked in place against the handle seat by the locking plate of the coupler.

Those of skill in the art will recognize that this invention may be embodied in several forms, without departing from the spirit of the invention, and the foregoing description is therefore intended to be illustrative and not restrictive.

We claim:

1. An assembly, comprising:
    a container defining a wall and a first stud and a second stud, each of said first stud and said second stud comprising:
    a head portion and
    a stem portion;
    a sprayer having a spray end and a wall, said wall defining a first opening and a second opening, each of said first opening and said second opening comprising:
    a first portion wider than said stem portion and narrower than said head portion;
    a second portion wider than said head portion, wherein said container further comprises a seam and said first stud and said second stud intersect said seam.

2. The assembly of claim 1, wherein for said first opening and said second opening, said second portion is positioned closer to said spray end than said first portion.

3. The assembly of claim 2, wherein for each of said first stud and said second stud, said head portion overhangs said stem portion a first overhang distance on a first side and a second overhang distance on a second side, and at least one of said first overhang distance and said second overhang distance is at least .015 of an inch.

4. The assembly of claim 1, wherein for each of said first stud and said second stud, said head portion overhangs said stem portion a first overhang distance on a first side and a second overhang distance on a second side, and at least one of said first overhang distance and said second overhang distance is at least .015 of an inch.

* * * * *

UNITED STATES PATENT AND TRADEMARK OFFICE
CERTIFICATE OF CORRECTION

PATENT NO. : 5,860,574
DATED : 1/19/99
INVENTOR(S) : Shanklin et al

It is certified that error appears in the above-identified patent and that said Letters Patent is hereby corrected as shown below:

On the title page, Item [63], after "1997", insert --Pat. No: 5,816,447--.

Column 1, line 5, please delete "pending,".

Column 1, line 5, replace "1997" with --1997, now issued as U.S. Patent No. 5,816,447--.

Signed and Sealed this

Twenty-seventh Day of April, 1999

Attest:

Q. TODD DICKINSON

*Attesting Officer*    *Acting Commissioner of Patents and Trademarks*